(12) United States Patent
Hayashi et al.

(10) Patent No.: US 9,661,166 B2
(45) Date of Patent: May 23, 2017

(54) IMAGE PROCESSING APPARATUS, REGION DETECTION METHOD AND COMPUTER-READABLE, NON-TRANSITORY MEDIUM

(71) Applicant: PFU LIMITED, Kahoku-shi, Ishikawa (JP)

(72) Inventors: Ryo Hayashi, Kahoku (JP); Kiyoto Kosaka, Kahoku (JP); Masayoshi Hayashi, Kahoku (JP)

(73) Assignee: PFU Limited, Kahoku-shi (JP)

( * ) Notice: Subject to any disclaimer, the term of this patent is extended or adjusted under 35 U.S.C. 154(b) by 0 days.

(21) Appl. No.: 14/831,547

(22) Filed: Aug. 20, 2015

(65) Prior Publication Data

US 2016/0277613 A1    Sep. 22, 2016

(30) Foreign Application Priority Data

Mar. 20, 2015 (JP) ................................ 2015-058643

(51) Int. Cl.
| | | |
|---|---|---|
| *H04N 1/60* | (2006.01) | |
| *G06K 15/00* | (2006.01) | |
| *G06K 9/00* | (2006.01) | |
| *H04N 1/00* | (2006.01) | |
| *H04N 1/387* | (2006.01) | |

(52) U.S. Cl.
CPC ....... *H04N 1/00748* (2013.01); *H04N 1/3872* (2013.01); *H04N 1/60* (2013.01); *H04N 2201/0081* (2013.01)

(58) Field of Classification Search
None
See application file for complete search history.

(56) References Cited

U.S. PATENT DOCUMENTS

| | | | | |
|---|---|---|---|---|
| 5,497,431 A | * | 3/1996 | Nakamura | H04N 1/46 358/520 |
| 5,777,758 A | * | 7/1998 | Tanabe | H04N 1/58 345/418 |

(Continued)

FOREIGN PATENT DOCUMENTS

| | | |
|---|---|---|
| JP | 2007-88654 A | 4/2007 |
| JP | 2007-134830 A | 5/2007 |

(Continued)

OTHER PUBLICATIONS

Office action mailed May 31, 2016 in corresponding JP Application No. 2015-058643 including Eng. translation, 10pp.

(Continued)

*Primary Examiner* — Madelein Nguyen
(74) *Attorney, Agent, or Firm* — Lewis Roca Rothgerber Christie LLP

(57) ABSTRACT

An image processing apparatus includes a color component image generator for extracting a particular color component from an input image to generate a color component image, an expanded-color-component image generator for expanding particular pixels in the color component image to generate an expanded-color-component image, an edge pixel extractor for extracting edge pixels from the expanded-color-component image, and a document region detector for detecting a document region from the edge pixels.

13 Claims, 18 Drawing Sheets

(56) References Cited

U.S. PATENT DOCUMENTS

| | | | |
|---|---|---|---|
| 6,249,607 B1* | 6/2001 | Murakawa | G06K 9/522 382/199 |
| 6,744,921 B1* | 6/2004 | Uchida | H04N 1/6022 358/462 |
| 6,781,720 B1* | 8/2004 | Klassen | G06T 7/0083 358/1.9 |
| 7,079,685 B1* | 7/2006 | Hirota | H04N 1/58 382/167 |
| 7,835,573 B2 | 11/2010 | Kang et al. | |
| 2001/0020950 A1* | 9/2001 | Shimizu | G06T 3/403 345/611 |
| 2002/0071131 A1* | 6/2002 | Nishida | H04N 1/4095 358/1.9 |
| 2003/0048476 A1* | 3/2003 | Yamakawa | H04N 1/6072 358/3.1 |
| 2003/0081836 A1* | 5/2003 | Averbuch | G06K 9/38 382/199 |
| 2003/0118231 A1* | 6/2003 | Uchida | H04N 1/58 382/164 |
| 2003/0142865 A1* | 7/2003 | Hirota | G06T 7/0083 382/167 |
| 2004/0189656 A1* | 9/2004 | Moore | G06T 15/80 345/589 |
| 2004/0263514 A1* | 12/2004 | Jin | G06K 9/0063 345/440 |
| 2005/0116955 A1* | 6/2005 | Cao | G06T 11/40 345/441 |
| 2005/0200867 A1* | 9/2005 | Faggion | G06T 11/40 358/1.9 |
| 2006/0284989 A1* | 12/2006 | Kang | H04N 9/045 348/222.1 |
| 2007/0002154 A1* | 1/2007 | Kang | H04N 9/045 348/272 |
| 2007/0065037 A1 | 3/2007 | Honda et al. | |
| 2007/0103735 A1 | 5/2007 | Ikeno et al. | |
| 2008/0174797 A1* | 7/2008 | Shin | H04N 1/58 358/1.9 |
| 2008/0278602 A1* | 11/2008 | Otsu | H04N 3/1562 348/223.1 |
| 2009/0190193 A1* | 7/2009 | Sato | H04N 1/486 358/505 |
| 2009/0273818 A1 | 11/2009 | Matsui | |
| 2009/0316024 A1* | 12/2009 | Noh | G06T 5/20 348/252 |
| 2011/0164816 A1* | 7/2011 | Guo | G06K 9/00241 382/165 |
| 2011/0298953 A1* | 12/2011 | Nakamura | H04N 5/3572 348/241 |
| 2012/0013769 A1* | 1/2012 | Kiyosawa | H04N 9/78 348/234 |
| 2013/0121595 A1 | 5/2013 | Kawatani et al. | |
| 2014/0294303 A1 | 10/2014 | Kawatani et al. | |

FOREIGN PATENT DOCUMENTS

| | | |
|---|---|---|
| JP | 2008-147712 A | 6/2008 |
| JP | 2009-272676 A | 11/2009 |
| JP | 2011-141622 A | 7/2011 |
| JP | 2013-106160 A | 5/2013 |
| JP | 2014-195148 A | 10/2014 |

OTHER PUBLICATIONS

Office action mailed May 24, 2016 in corresponding JP Application No. 2015-058637 including Eng. translation, 14pp.

Office action dated Jan. 6, 2017 for related U.S. Appl. No. 14/831,596, 14pp.

Office action mailed Oct. 18, 2016 in corresponding JP Application No. 2015-058637 including Eng. translation, 7pp.

Office action mailed May 31, 2016 in corresponding JP Application No. 2015-058643 including Eng. translation, 13pp.

Office action mailed May 24, 2016 in corresponding JP Application No. 2015-058637 including Eng. translation, 19pp.

* cited by examiner

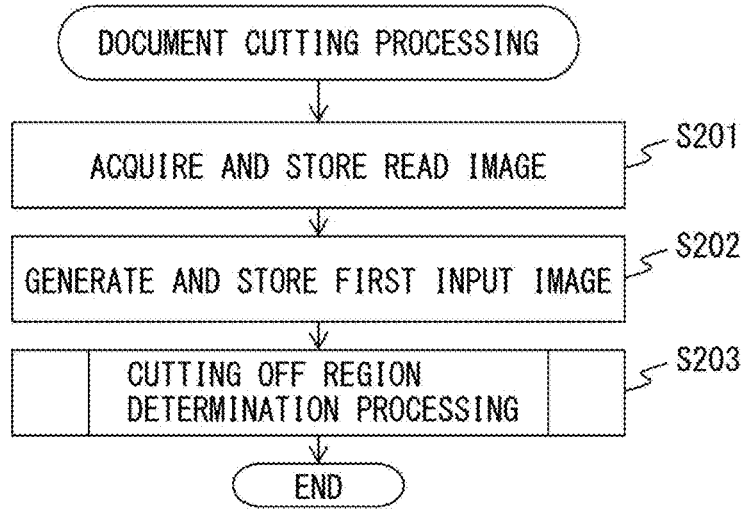
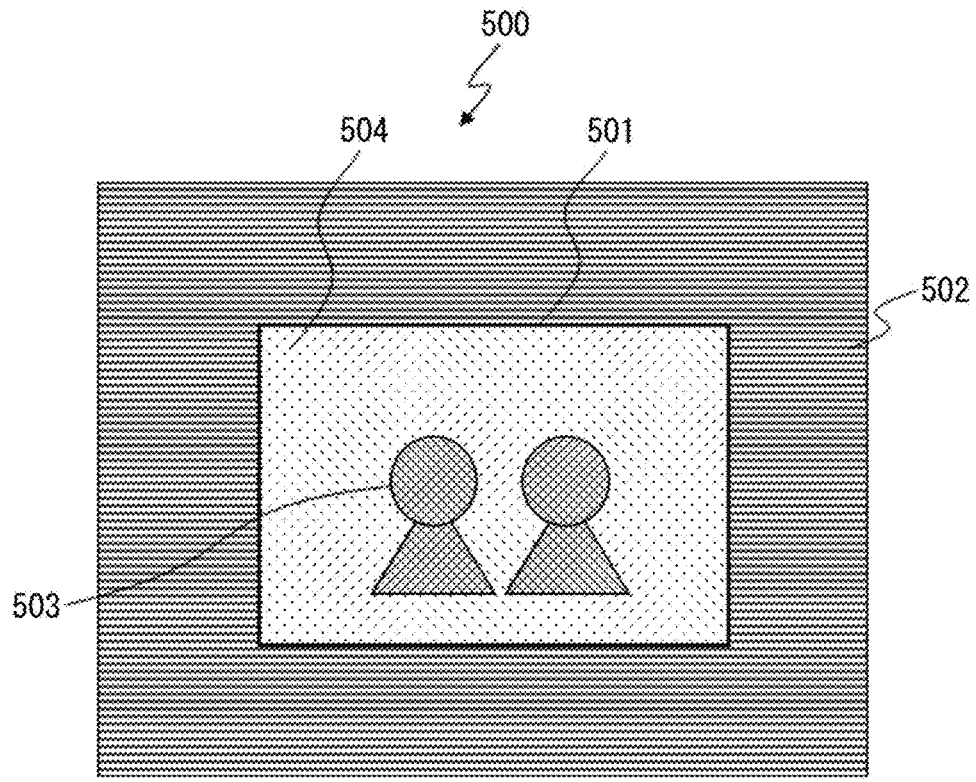

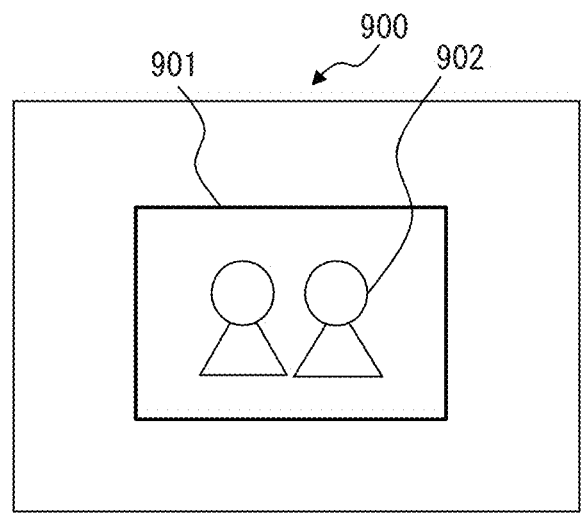
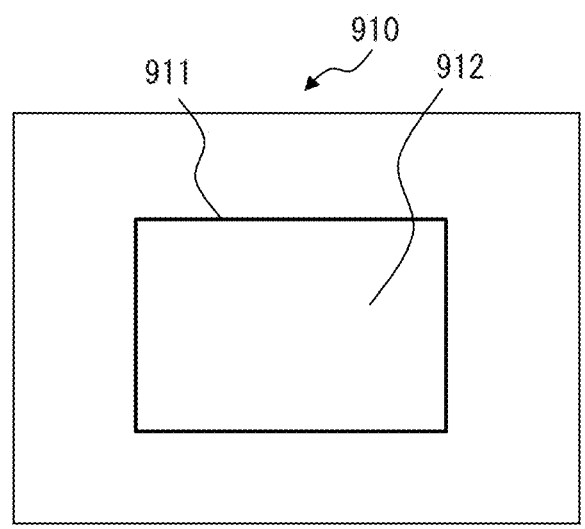

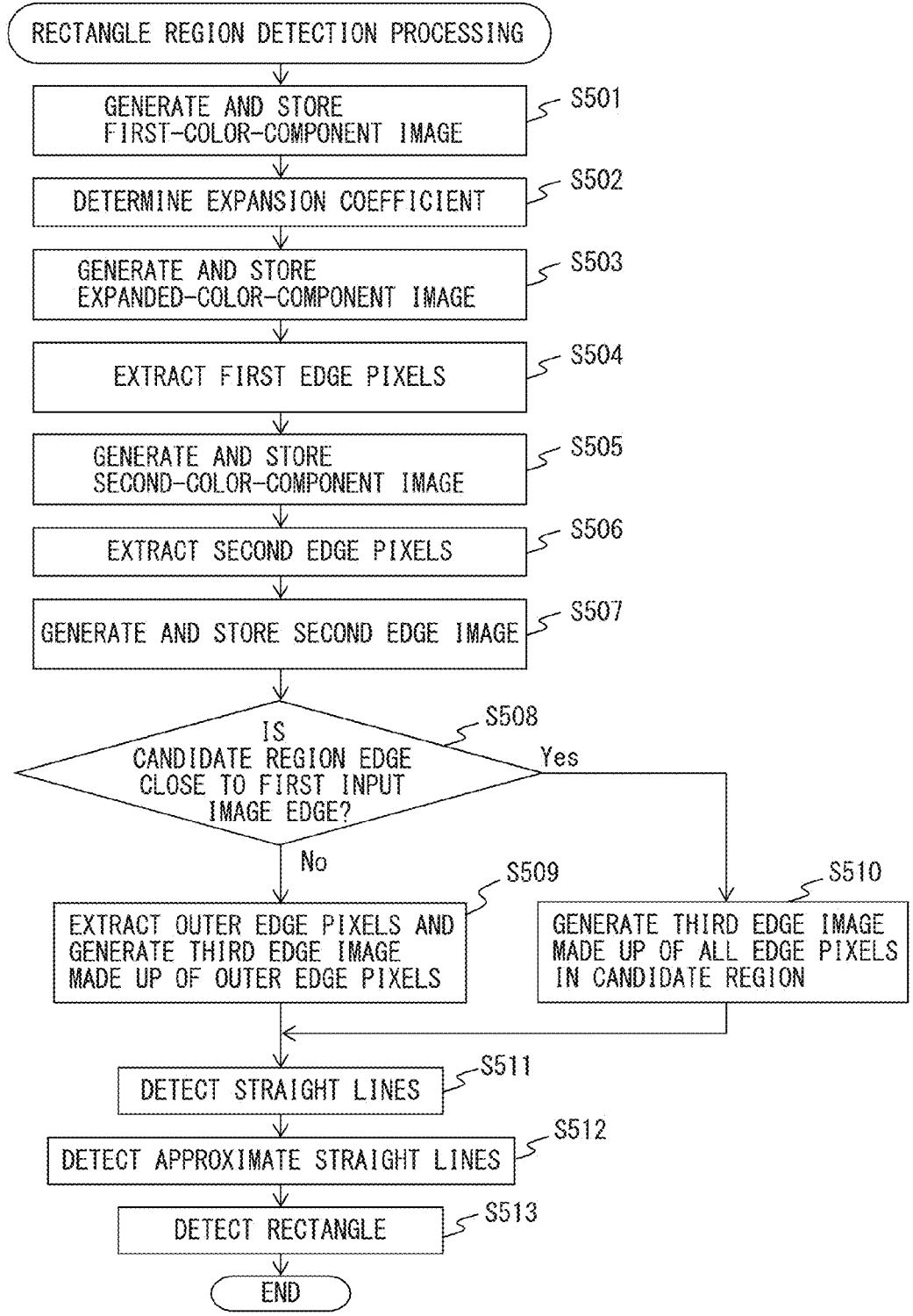

IMAGE PROCESSING APPARATUS, REGION DETECTION METHOD AND COMPUTER-READABLE, NON-TRANSITORY MEDIUM

CROSS-REFERENCE TO RELATED APPLICATIONS

This application is based upon and claims the benefit of priority of prior Japanese Patent Application No. 2015-58643, filed on Mar. 20, 2015, the entire contents of which are incorporated herein by reference.

TECHNICAL FIELD

Embodiments discussed in the present specification relate to detect a region from an image.

BACKGROUND

In order to read a document using a scanner or the like and store it as image data, it is necessary to accurately detect a document region in the read image. In a flatbed-type or automatic document feeding-type scanner in general, a document region can be easily distinguished from the other regions using a backing of a monotone color such as white, black, and the like. On the other hand, overhead scanners, which read a document placed on a desk or the like, are currently being used and the capability of accurately distinguishing between a pattern on a desk and a document is required of such scanners.

Overhead scanners are sometimes used for scanning a photograph affixed on a page of an album in which photographs can be affixed on self-adhesive pages. In such a case, it is necessary to accurately distinguish between a region of the page in which a stripe pattern of deteriorated glue appears and the photograph.

An image reading apparatus that obtains a document region from a read image has been disclosed. The image reading apparatus determines a method for cutting out a document region based on degree of coincidence between apex coordinates of a first rectangle region including all subjects and apex coordinates of a second rectangle region including all subjects determined as contents of the document among all of the subjects and having the smallest area (see Japanese Laid-open Patent Publication No. 2009-272676).

An image reading apparatus that generates reference data for detecting document edges using image data in a region in which a baking part appears across the full width of the region and obtains a difference between the reference data and image data to detect edges of a document has been disclosed. The image reading apparatus performs edge detection in given lines in the horizontal and vertical directions to detect the four sides of the document, thereby automatically recognizing the document image (see Japanese Laid-open Patent Publication No. 2007-88654).

An image processing apparatus that detects a boundary of a document in an input image has been disclosed. The image processing apparatus extracts edge pixels from an input image, extracts a plurality of straight lines from the edge pixels, extracts candidate rectangle regions from the extracted straight lines, and selects a rectangle region based on the number of edge pixels that are located within a predetermined distance from each side of each candidate rectangle region and the degree likelihood of being a corner of each possible corner (see Japanese Laid-open Patent Publication No. 2013-106160).

Furthermore, an image processing apparatus that determines a region in which an image of a document is cut out from a read image has been disclosed. The image processing apparatus detects a subject region in an input image and detects a rectangle region in the subject region. When the rectangle region matches the subject region, the image processing apparatus determines the rectangle region as the region to be cut out; when the rectangle region does not match the subject region, the image processing apparatus determines a region including the subject region as a region to be cut out (see Japanese Laid-open Patent Publication No. 2014-195148).

SUMMARY

There is the need for accurate detection of a region in which an image of a document is to be cut out from a read image to an image processing apparatus such as a scanner.

Accordingly, it is an object to provide an image processing apparatus and a region detection method that can accurately detect a region in which an image of a document is to be cut out from a read image and a computer-readable, non-transitory medium storing a computer program for causing a computer to implement such a region detection method.

According to an aspect of the apparatus, there is provided an image processing device. The image processing device includes a color component image generator for extracting a particular color component from an input image to generate a color component image, an expanded-color-component image generator for expanding particular pixels in the color component image to generate an expanded-color-component image, an edge pixel extractor for extracting edge pixels from the expanded-color-component image, and a document region detector for detecting a document region from the edge pixels.

According to an aspect of the method, there is provided a region detection method. The region detection method includes extracting a particular color component from an input image to generate a color component image, expanding particular pixels in the color component image to generate an expanded-color-component image, extracting edge pixels from the expanded-color-component image, and detecting, using a computer, a document region from the edge pixels.

According to an aspect of the computer-readable, non-transitory medium storing a computer program, the computer program causes a computer to execute a process, including extracting a particular color component from an input image to generate a color component image, expanding particular pixels in the color component image to generate an expanded-color-component image, extracting edge pixels from the expanded-color-component image, and detecting a document region from the edge pixels.

The object and advantages of the invention will be realized and attained by means of the elements and combinations particularly pointed out in the claims. It is to be understood that both the foregoing general description and the following detailed description are exemplary and explanatory, and are not restrictive of the invention, as claimed.

BRIEF DESCRIPTION OF THE DRAWINGS

FIG. 4 is a flowchart illustrating an operation of document cutting processing;

FIG. 5 is a schematic diagram illustrating an image in the document cutting processing;

FIG. 9A is a schematic diagram illustrating an image in the candidate region detection processing;

FIG. 9B is a schematic diagram illustrating an image in the candidate region detection processing;

FIG. 10 is a flowchart illustrating an exemplary operation of rectangle region detection processing;

DESCRIPTION OF EMBODIMENTS

Hereinafter, an image processing apparatus, a region detection method and a computer program according to an embodiment, will be described with reference to the drawings. However, it should be noted that the technical scope of the invention is not limited to these embodiments, and extends to the inventions described in the claims and their equivalents.

Figure 1:
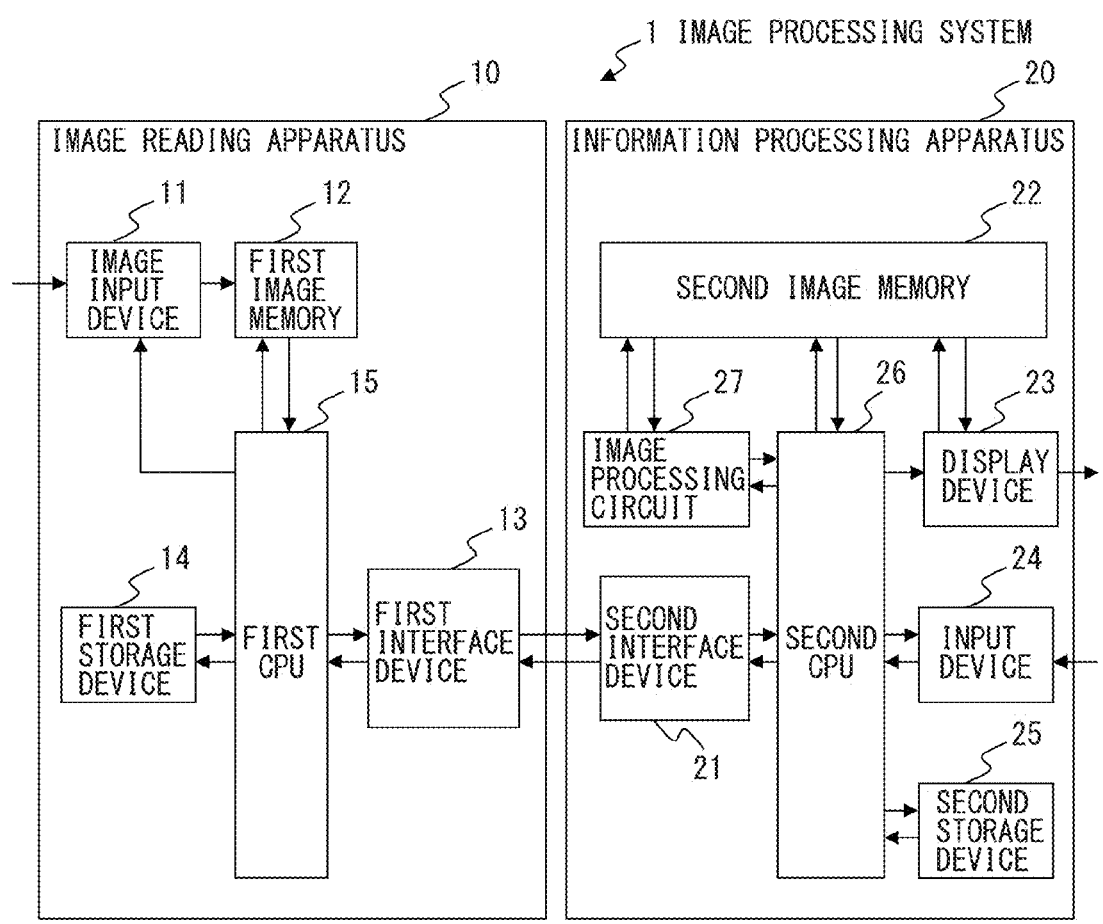
FIG. 1 is a diagram schematically illustrating a configuration of the image processing system 1 according to an embodiment.

FIG. 1 is a diagram schematically illustrating a configuration of the image processing system according to the embodiment. As illustrated in FIG. 1, the image processing system 1 includes an image reading apparatus 10 and an information processing apparatus 20. The image reading apparatus 10 may be an image scanner, a digital camera or the like, for example. The information processing apparatus 20 may be a personal computer or the like, for example, connected and used with the image reading apparatus 10.

The image reading apparatus 10 includes an image input device 11, a first image memory 12, a first interface device 13, a first storage device 14, and a first CPU (Control Processing Unit) 15. Components of the image reading apparatus 10 will be described below.

The image input device 11 includes an image sensor imaging an image of a document or the like that is an imaging subject. The image sensor includes imaging elements and an optical system which forms an image of an imaging subject onto the imaging element. Each of the imaging elements outputs an analog value corresponding to each of RGB colors. The imaging elements are CCD (Charge Coupled Device) elements, CMOS (Complementary Metal Oxide Semiconductor) elements or the like arranged in a one-dimensional or two-dimensional array. The image input device 11 converts analog values output from the image sensor to digital values to generate pixel data and generates image data (hereinafter referred to as an RGB image) made up of the pieces of generated pixel data. The RGB image is color image data in which each piece of pixel data is made up of a 24-bit RGB value, for example, each of the RGB color components of which is represented by 8 bits.

The image input device 11 generates an RGB image or an image (hereinafter referred to as a read image) generated by converting the RBG values of the pixels in an RBG image into brightness values and color difference values (YUV values), and stores the read image in the first image memory 12. Note that the YUV values can be calculated in accordance with the following expressions, for example.

$$Y \text{ value}=0.30\times R \text{ value}+0.59\times G \text{ value}+0.11\times B \text{ value} \quad (1)$$

$$U \text{ value}=0.17\times R \text{ value}-0.33\times G \text{ value}+0.50\times B \text{ value} \quad (2)$$

$$V \text{ value}=0.50\times R \text{ value}-0.42\times G \text{ value}-0.08\times B \text{ value} \quad (3)$$

The first image memory 12 includes a storage device such as a nonvolatile semiconductor memory, a volatile semiconductor memory, a magnetic disk, or the like. The first image memory 12 is connected to the image input device 11 and stores a read image generated by the image input device 11.

The first interface device 13 includes an interface circuit compatible with a serial bus such as USB (Universal Serial Bus) and is electrically connected to the information processing apparatus 20 to transmit and receive image data and various kinds of information. A flash memory or the like may be connected to the first interface device 13, image data stored in the first image memory 12 may be temporarily stored in the flash memory and then copied to the information processing apparatus 20.

The first storage device 14 includes a memory device such as a RAM (Random Access Memory), a ROM (Read Only Memory), a fixed disk device such as a hard disk or a portable storage device such as a flexible disk, an optical disc, or the like. Computer programs, databases, tables and the like which are used for various kinds of processing by the image reading apparatus 10 are stored in the first storage device 14. Further, the first storage device 14 stores a computer program, a database, a table, and the like that are used for various processing of the image reading apparatus 10. The computer program may be installed on the storage device 104 from a computer-readable, non-transitory medium such as a compact disk read only memory (CD-ROM), a digital versatile disk read only memory (DVD-ROM), or the like by using a well-known setup program or the like.

The first CPU 15 is connected to and controls the image input device 11, the first image memory 12, the first interface device 13 and the first storage device 14. The first CPU 15 performs control of read image generation by the image input device 11, control of the first image memory 12, control of data transmission and reception to and from the information processing apparatus 20 through the first interface device 13, control of the first storage device 14, and other operations.

The information processing apparatus 20 includes a second interface device 21, a second image memory 22, a display device 23, an input device 24, a second storage device 25, a second CPU 26, and an image processing circuit 27. The components of the information processing apparatus 20 will be described below in detail.

The second interface device 21 includes an interface circuit similar to that of the first interface device 13 of the image reading apparatus 10 and interconnects the information processing apparatus 20 and the image reading apparatus 10.

The second image memory 22 includes a storage device similar to that of the first image memory 12 of the image reading apparatus 10. The second image memory 22 stores a read image received from the image reading apparatus 10 through the second interface device 21 and is connected to the image processing circuit 27 to store various processed images resulting from image processing of read images by the image processing circuit 27.

The display device 23 includes a display formed by a liquid-crystal display, an organic electroluminescence display or the like and an interface circuit which outputs image data to the display, and is connected to the second image memory 22 to display image data stored in the second image memory 22 on the display.

The input device 24 includes an input device such as a keyboard, a mouse or the like and an interface circuit acquiring signals from the input device and outputs a signal responsive to a user's operation to the second CPU 26.

The second storage device 25 includes a memory device, a fixed disk device, a portable storage device or the like that is similar to that of the first storage device 14 of the image reading apparatus 10. The second storage device 25 stores computer programs, databases, tables and the like used in various kinds of processing by the information processing apparatus 20. Further, the second storage device 25 stores a computer program, a database, a table, and the like that are used for various processing of the information processing apparatus 20. The computer program may be installed on the second storage device 25 from a computer-readable, non-transitory medium such as a CD-ROM, a DVD-ROM, or the like by using a well-known setup program or the like.

The second CPU 26 is connected to and controls the second interface device 21, the second image memory 22, the display device 23, the input device 24, the second storage device 25 and the image processing circuit 27. The second CPU 26 performs control of data transmission and reception with the image reading apparatus 10 through the second interface device 21, control of the second image memory 22, control of display of the display device 23, control of input of input device 24, control of the second storage device 25, control of image processing of the image processing circuit 27, and other operations.

The image processing circuit 27 is connected to the second image memory 22 and performs document cutting processing. The image processing circuit 27 is connected to the second CPU 26 and operates in accordance with a program stored in the second storage device 25 beforehand under the control of the second CPU 26. Note that the image processing circuit 27 may be formed by an independent integrated circuit, a microprocessor, firmware or the like.

Figure 2:
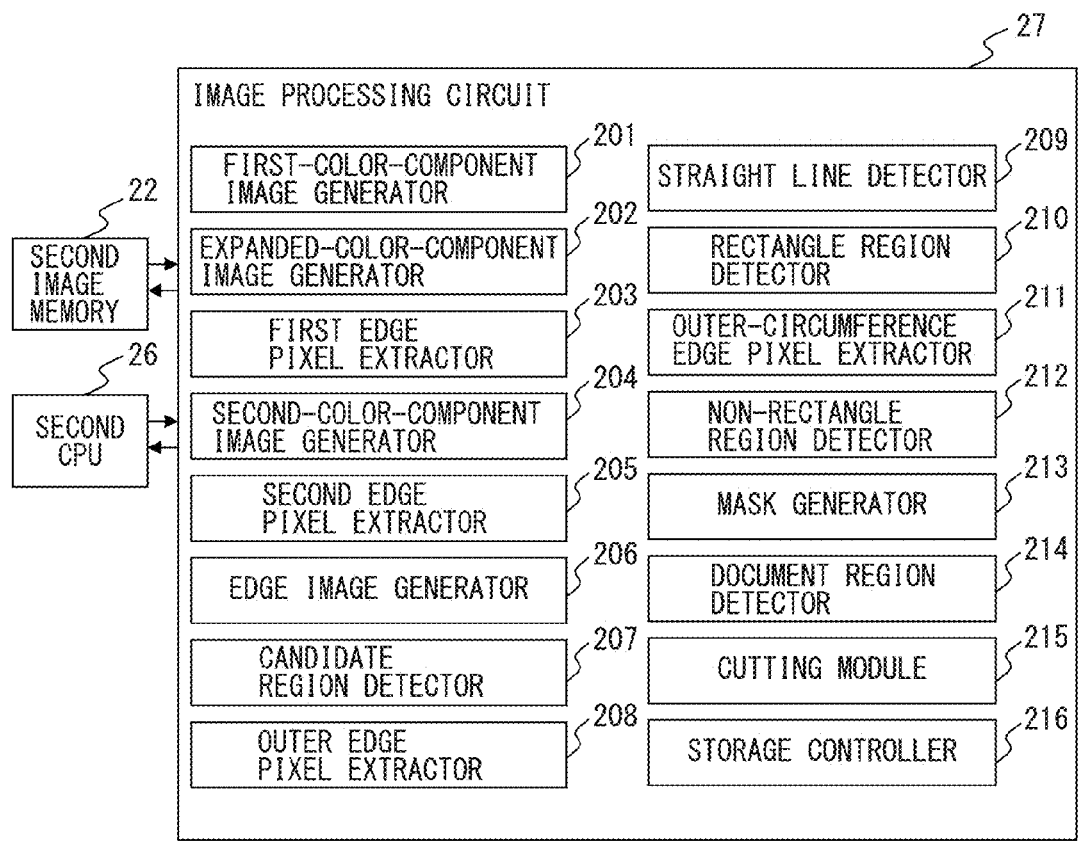
FIG. 2 is a diagram schematically illustrating a configuration of an image processing circuit 27.

FIG. 2 is a diagram illustrating a schematic configuration of the image processing circuit 27. As illustrated in FIG. 2, the image processing circuit 27 includes a first-color-component image generator 201, an expanded-color-component image generator 202, a first edge pixel extractor 203, a second-color-component image generator 204, a second edge pixel extractor 205, an edge image generator 206, a candidate region detector 207, an outer edge pixel extractor 208, a straight line detector 209, a rectangle region detector 210, an outer circumference edge pixel extractor 211, a non-rectangle region detector 212, a mask generator 213, a document region detector 214, a cutting module 215 and a storage controller 216. Some of these components may be functional modules implemented by software or firmware running on a processor. Note that some of these components may be formed by independent integrated circuits, microprocessors or the like.

Figure 3:
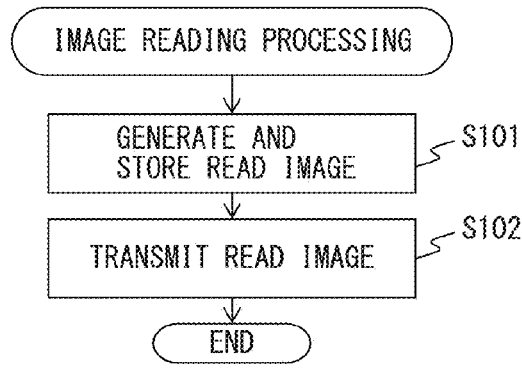
FIG. 3 is a flowchart illustrating an operation of image reading processing.

FIG. 3 is a flowchart illustrating an operation of image reading processing performed by the image reading apparatus 10. The operation of the image reading processing will be described below with reference to the flowchart in FIG. 3. Note that the flow of the operation described below is executed primarily by the first CPU 15 in cooperation with the components of the image reading apparatus 10 in accordance with a program stored in the first storage device 14 beforehand.

First, the image input device 11 images a document, which is an imaging subject, to generate a read image and stores the read image in the first image memory 12 (step S101).

Then the first CPU 15 transmits the read image stored in the first image memory 12 to the information processing apparatus 20 through the first interface device 13 (step S102), then ends the sequence of steps.

FIG. 4 is a flowchart illustrating an operation of document cutting processing performed by the information processing apparatus 20. The operation of the document cutting processing will be described below with reference to the flowchart illustrated in FIG. 4. Note that the flow of the operation described below is executed primarily by the second CPU 26 in cooperation with the components of the information processing apparatus 20 in accordance with a program stored in the second storage device 25 beforehand.

First, the second CPU 26 acquires a read image from the image reading apparatus 10 through the second interface device 21 and stores the read image in the second image memory 22 (step S201).

Then, the image processing circuit 27 retrieves the read image stored in the second image memory 22, decimates pixels in the read image in the horizontal and vertical directions to generate a first input image, and stores the first input image in the second image memory 22 (step S202). The first input image is an example of an input image.

In general, the processing speed of the information processing apparatus 20 significantly varies depending on the number of pixels of images being processed. Therefore the rate of pixel decimation is determined in accordance with the throughput of the second CPU 26 and other components and the processing speed required of the information processing apparatus 20. Note that when processing speed requirements are met without decimating pixels, the read image may be used as the first input image without decimation.

FIG. 5 is a schematic diagram for illustrating an image in document cutting processing. The image 500 illustrated in FIG. 5 is an example of a first input image. The first input image 500 is an image obtained by imaging, as a document, a photograph 501 affixed on a page of an album 502 in which photographs can be affixed on self-adhesive pages. The photograph 501 includes subjects such as people 503. The page of the album 502 has a concavo-convex shape in a stripe pattern. Glue on the page of the album 502 is reddish due to deterioration and reddish portions and white portions appear as a stripe pattern in the first input image 500. Further, random noise 504 produced by the influence of the imaging element and the optical system of the image input device 11 of the image reading apparatus 10 is imaged in the first input image 500.

Each unit of the image processing circuit 27 executes cutting off region determination processing on the first input image (step S203) and then ends a series of steps. In the cutting off region determination processing, each unit of the image processing circuit 27 determines a cutting off region in which an image of a document is cut out from the first input image. The cutting off region determination processing will be described in detail later.

Figure 6:
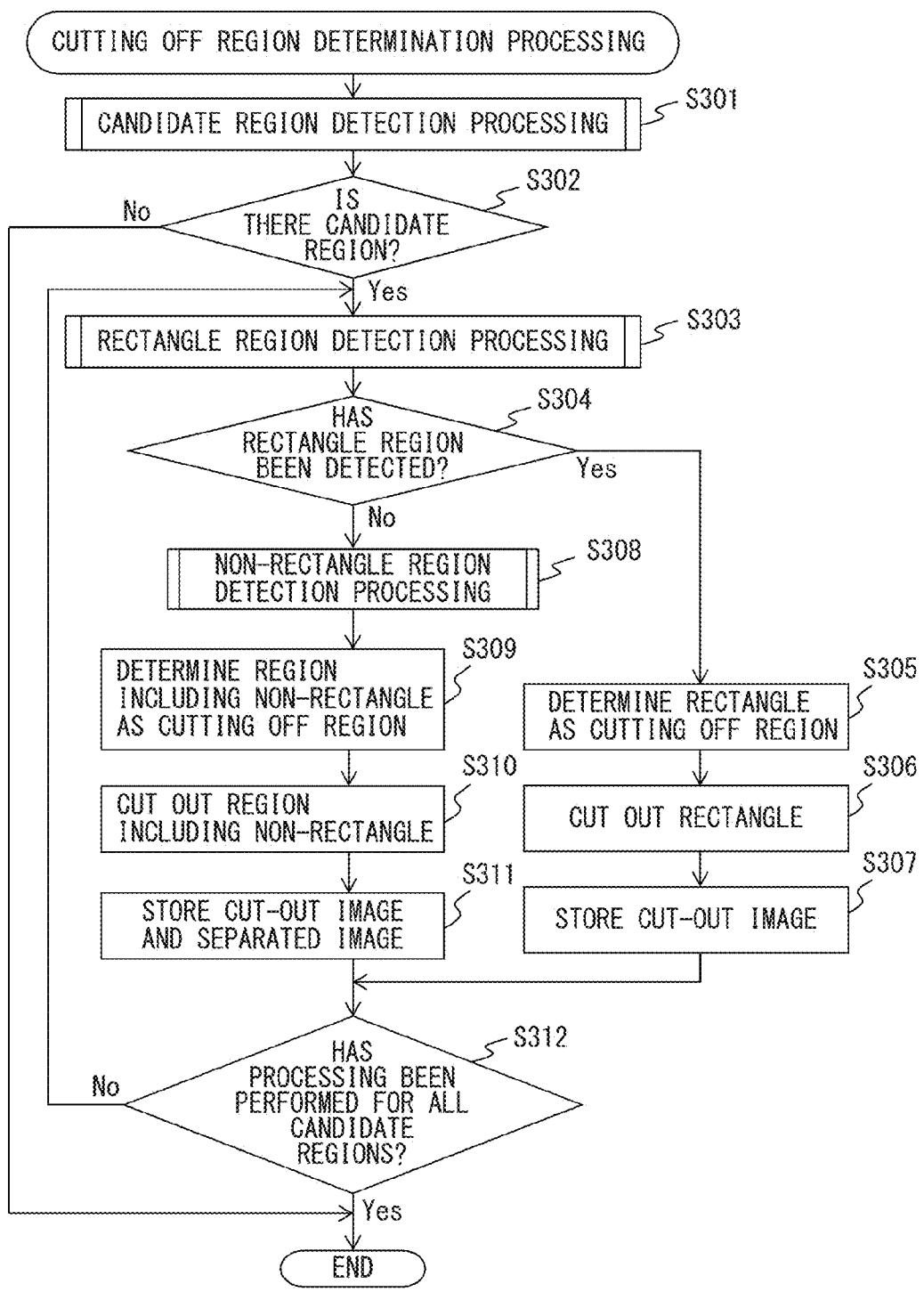
FIG. 6 is a flowchart illustrating an exemplary operation of cutting off region determination processing.

FIG. 6 is a flowchart illustrating an example of an operation of the cutting off region determination processing. The operation flow illustrated in FIG. 6 is executed at step S203 of the flowchart illustrated in FIG. 4.

First, each unit of the image processing circuit 27 executes candidate region detection processing on the first input image (step S301). In the candidate region detection processing, the first edge pixel extractor 203 and the second edge pixel extractor 205 extract edge pixels from the first input image and the candidate region detector 207 detects a candidate region surrounded by connected edge pixels among the extracted edge pixels. The candidate region detection processing will be described in detail later.

Then the candidate region detector 207 determines whether or not a candidate region has been detected in the candidate region detection processing (step S302). When no candidate region has been detected, the candidate region detector 207 does not perform further processing and ends the sequence of steps; on the other hand, when a candidate region has been detected, the processing proceeds to step S303. Processing at steps S303 through S312 is performed for each extracted candidate region.

Then the components of the image processing circuit 27 perform rectangle region detection processing for the candidate region (step S303). In the rectangle region detection processing, the first edge pixel extractor 203 or the second edge pixel detector 205 extracts edge pixels and the outer edge pixel extractor 208 extracts outer edge pixels located at the outer side among the edge pixels. Furthermore, the straight line detector 209 detects a plurality of straight lines from the outer edge pixels and the rectangle region detector 210 detects a rectangle region consisting of four straight lines where two pairs of the detected plurality of straight lines intersect at substantially right angles. Details of the rectangle region detection processing will be described later.

Then, the document region detector 214 determines whether or not a rectangle region has been detected by the rectangle region detector 210 in the rectangle region detection processing (step S304). When a rectangle region has been detected by the rectangle region detector 210, the document region detector 214 determines the detected rectangle region as the document region and as a cutting off region in which an image of the document is to be cut out from the first input image (step S305). In this way, the document region detector 214 detects a document region from the edge pixels extracted by the first edge pixel extractor 203 or the second edge pixel extractor 205. Then, the cutting module 215 cuts out the determined cutting off region, i.e. the detected rectangle region, from the input image (step S306).

Then, the storage controller 216 stores the cut-out image in the second image memory 22 (step S307). The storage controller 216 stores the cut-out image in a storage medium, such as a nonvolatile semiconductor memory, that stores images in the long term basis in the second image memory 22. Note that the storage controller 216 may store the cut-out image in a hard disk or the like of the second storage device 25. The image stored in the second image memory 22 or the second storage device 25 is displayed on the display device 23 in response to request from a user using the input device 24.

On the other hand, when no rectangle region has been detected by the rectangle region detector 210, each unit of the image processing circuit 27 executes non-rectangle region detection processing on the candidate region (step S308). In the non-rectangle region detection processing, the first edge pixel extractor 203 and the second edge pixel extractor 205 extract edge pixels and the outer circumference pixel extractor 211 extracts outer circumference edge pixels that make up the outer circumference of connected edge pixels among the extracted edge pixels. Further, the non-rectangle region detector 212 detects a non-rectangle region surrounded by the outer circumference edge pixels and the mask generator 213 generates, based on the detected non-rectangle region, a mask for separating the background from an image to be cut out. The non-rectangle region detection processing will be described in detail later.

Then, the document region detector 214 determines a region including the non-rectangle region detected in the non-rectangle region detection processing as a cutting off region in which an image of the document is to be cut out from the first input image (step S309). The document region detector 214 determines the circumscribed rectangle region of the detected non-rectangle region as a cutting off region. Note that the document region detector 214 may determine the detected non-rectangle region itself as a cutting off region. In this way, the document region detector 214 detects a document region from the edge pixels extracted by the first edge pixel extractor 203 or the second edge pixel extractor 205. Then, the cutting module 215 cuts out a region including the determined cutting off region from the first input image (step S310). Further, the cutting module 215 uses the mask generated by the mask generator 213 to separate the background from the cut-out image, thereby extracting a separated image that represents the document alone.

Then, the storage controller 216 stores the cut-out image and the separated image in the second image memory 22 (step S311). The storage controller 216 stores the cut-out image in a storage medium, such as a nonvolatile semiconductor memory, that persistently stores images in the second image memory 22 and stores the separated image in a storage medium, such as a volatile semiconductor memory, that temporarily stores images. Note that the storage controller 216 may store the cut-out image in a hard disk or the like of the second storage device 25 and store the separated image in a RAM. Further, the storage controller 216 stores the cut-out image as a file and stores the separated image in a clipboard, for example, to make the separated image available to a given application. This allows the user to use the separated image simply by executing a paste command in document editor software, image editor software, spreadsheet software or the like, thereby improving the convenience to the user.

Note that the storage controller 216 may store a cut-out image (and a separated image) in which a non-rectangle region has been detected in a file format different from the file format of an image in which a rectangle region has been detected. For example, when a rectangle region has been detected (at step S307), the storage controller 216 stores the cut-out image in the JPEG (Joint Photographic Experts Group) format. On the other hand, when a non-rectangle region has been detected (at step S311), the storage controller 216 stores the cut-out image in the transparent PNG (Portable Network Graphics) format. Thus, the information processing apparatus 20 can store an image in a format that is suitable for the shape of the image to improve the convenience to the user.

Then, the image processing circuit 27 determines whether or not the processing has been performed for all of the candidate regions (step S312). When there is a candidate region for which the processing has not been performed, the image processing circuit 27 returns to step S303 and repeats the processing from step S303 through step S312; when the processing has been performed for all of the candidate regions, the image processing circuit 27 ends a series of the steps.

Figure 7:
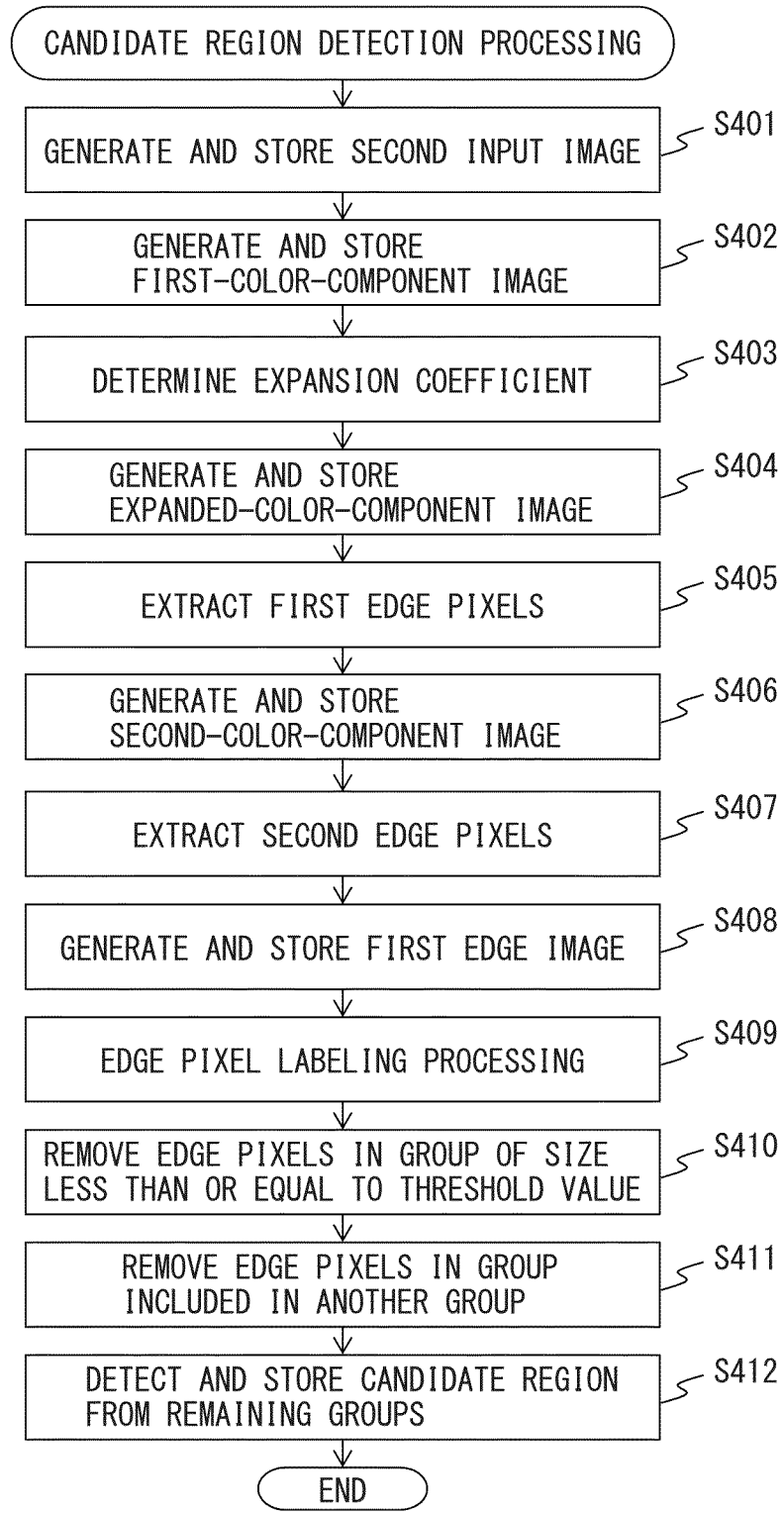
FIG. 7 is a flowchart illustrating an exemplary operation of candidate region detection processing.

FIG. 7 is a flowchart illustrating an example of an operation of candidate region detection processing. The flow of the operation illustrated in FIG. 7 is executed at step S301 of the flowchart illustrated in FIG. 6.

First, the image processing circuit 27 further vertically and horizontally decimates pixels from the first input image to generate a second input image and stores the second input image in the second image memory 22 (step S401). The second input image is another example of an input image.

Figure 8A:
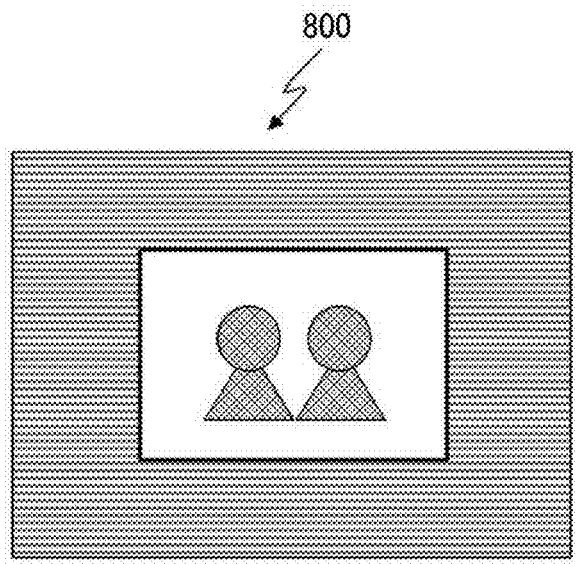
FIG. 8A is a schematic diagram illustrating an image in the candidate region detection processing.

FIGS. 8A to 8F and FIGS. 9A and 9B are schematic diagrams for illustrating each image in the candidate region detection processing. The image 800 illustrated in FIG. 8A is an example of a second input image. The decimating rate from the first input image 500 to the second input image 800 is previously determined to such a value that random noise 504 produced by the influence of the imaging element and the optical system of the image input device 11 of the image reading apparatus 10 is removed.

Note that the image processing circuit 27 may remove random noise 504 by applying a smoothing filter to the first input image instead of generating the second input image. Alternatively, the first edge pixel extractor 203 may further apply a smoothing filter to the second input image.

Then, the first-color-component image generator 201 extracts a first color component from the second input image to generate a first-color-component image and stores the first-color-component image in the second image memory 22 (step S402). A component obtained by subtracting a blue color component from a red color component, for example, is set as the first color component so that a reddish region due to deterioration of glue on a page of an album can be properly distinguished from a white region.

The first-color-component image generator 201 generates a first-color-component image made up of pieces of pixel data each of which has the value (R value–B value) from the second input image. When each pixel of the second input image is represented by YUV values, the first-color-component image generator 201 reconverts the YUV values into RGB values and calculates (R value–B value). Note that the RGB values can be calculated in accordance with the following expressions:

$$R \text{ value} = 1.000 \times Y \text{ value} + 1.402 \times V \text{ value} \qquad (4)$$

$$G \text{ value} = 1.000 \times Y \text{ value} - 0.344 \times U \text{ value} - 0.714 \times V \text{ value} \qquad (5)$$

$$B \text{ value} = 1.000 \times Y \text{ value} + 1.772 \times U \text{ value} \qquad (6)$$

Figure 8B:
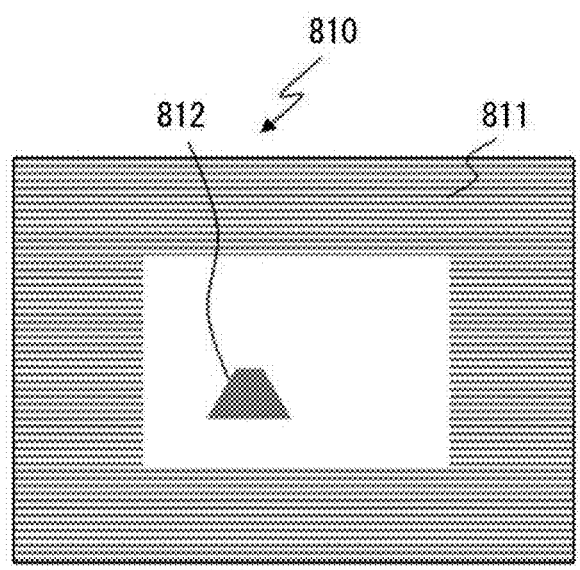
FIG. 8B is a schematic diagram illustrating an image in the candidate region detection processing.

The image 810 illustrated in FIG. 8B is an example of the first-color-component image. In the first-color-component image 810, a portion 811 that is reddish due to deterioration of glue on a page of an album and a reddish portion 812 in a photograph have high pixel values and the rest of the image 810 has low pixel values.

Note that the first-color-component image generator 201 may detect a color that is the largest in quantity included in the second input image and may determine the first color component based on the detected color. In that case, the first-color-component image generator 201 calculates the sum of R values, the sum of G values, and the sum of B values of the pixels in the second input image, detects the color component that has the largest sum, and determines a color component obtained by subtracting the other color components from the detected color component as the first color component. In this way, even when a background pattern tinged with a color other than red appears in the second input image, the first-color-component image generator 201 can properly extract the pattern to generate a first-color-component image. Note that since white contains red, green and blue components, white is also extracted as a first color component when red, green or blue is used as the first color component. The first-color-component image generator 201 therefore can inhibit white from being extracted as the first color component by subtracting, from the color component that has the largest sum, the other color components and using the resulting component as the first color component.

Then, the expanded-color-component image generator 202 determines an expansion coefficient for generating an expanded-color-component image, which will be described later, based on the pixels in the first-color-component image (step S403). The expanded-color-component image is used for submerging the pixels having high values of the first color component by expanding pixels having high pixel values in the first-color-component image to interconnect pixels corresponding to neighboring stripes among the stripes making up the stripe pattern.

For example, the expanded-color-component image generator 202 detects the cycle of occurrence of a color in the second input image and determines an expansion coefficient based on the detected cycle. In that case, the expanded-color-component image generator 202 horizontally or vertically scans pixels in the first-color-component image and calculates the number of changes from a pixel that has a pixel value greater than or equal to a predetermined value to a pixel that has a pixel value less than the predetermined value. The expanded-color-component image generator 202 divides the total number of pixels in the horizontal or vertical direction in the first-color-component image by the calculated number of changes to calculate the divided value as the cycle of occurrence of a color and determines the cycle of occurrence as the expansion coefficient. The expanded-color-component image generator 202 can use the expansion coefficient to appropriately interconnect pixels that correspond to neighboring stripes among the stripes making up a stripe pattern in an expanded-color-component image.

Note that the expanded-color-component image generator 202 may determine an expansion coefficient such that the number of first edge pixels extracted from an expanded-color-component image generated based on the expansion coefficient becomes less than or equal to a predetermined number (for example, 10% of the number of all the pixels in the image). In that case, the expanded-color-component image generator 202 sequentially increments the expansion coefficient, starting from 1, and repeats processing at steps S404 and S405, which will be described later, until the number of first edge pixels extracted from the expanded-color-component image decreases to a predetermined number or less. As a result, pixels that correspond to neighboring strips in the stripe pattern in the expanded-color-component image can be more reliably interconnected. Alternatively, the expanded-color-component image generator 202 may use a predetermined number (for example, 5) as the expansion coefficient.

The expanded-color-component image generator 202 then expands particular pixels in the first-color-component image to generate an expanded-color-component image and stores the expanded-color-component image in the second image memory 22 (step S404). Pixels that have higher pixel values than pixels surrounding the particular pixels are set as the particular pixels. The surrounding pixels are pixels that are located around a particular pixel and are pixels located within a predetermined distance (for example, within a 3-pixel) from the particular pixel, for example. The expanded-color-component image generator 202 replaces the pixel values of pixels in the first-color-component image with the highest pixel value among the pixel values of the pixels surrounding each pixel to generate an expanded-color-component image.

Note that expanding pixels having high pixel values shifts the position of an edge formed by an edge of the photograph inward from the original position of the edge of the photograph in the expanded-color-component image. Therefore, the expanded-color-component image generator 202 replaces the pixel value of each pixel in the expanded-color-component image with the lowest pixel value among the pixel values of the surrounding pixels surrounding each pixel to execute contraction processing on the expanded-color-component image. This can return the position of the edge formed by the edge of the photograph to the original position of the edge of the photograph in the expanded-color-component image.

Figure 8C:
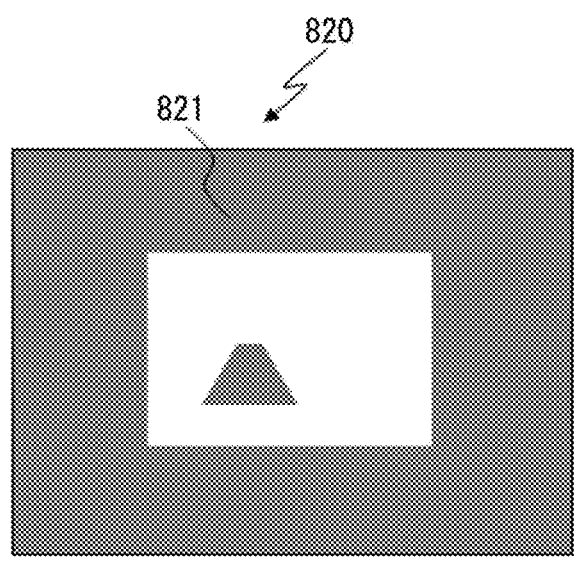
FIG. 8C is a schematic diagram illustrating an image in the candidate region detection processing.

The image 820 illustrated in FIG. 8C is an example of the expanded-color-component image. In the expanded-color-component image 820, a portion 811 of the first-color-component image 810 in FIG. 8B that is reddish due to deterioration of glue on the page of the album expands and the pixel values in the entire portion 821 that corresponds to the page of the album increase.

Then, the first edge pixel extractor 203 extracts first edge pixels in the horizontal direction and the vertical direction from the expanded-color-component image (step S405).

The first edge pixel extractor 203 calculates an absolute value of a difference between the brightness values of both neighboring pixels in a horizontal direction of each pixel of the expanded-color-component image (hereinafter, referred to as a neighboring difference value) and designates the pixel on the image as a vertical edge pixel when the neighboring difference value exceeds a threshold value Th1. It is possible to set this threshold value Th1 as a value difference (for example, 20) where, for example, people can visually discriminate a difference between color components on an image. Further, the first edge pixel extractor 203 performs the same processing on the pixels in the vertical direction and extracts horizontal edge pixels.

Note that the first edge pixel extractor 203 may label the extracted vertical edge pixels and horizontal edge pixels to group them and may remove the edge pixels included in a group of a size in the horizontal or vertical direction smaller than or equal to a threshold value Th2. The threshold value Th2 is set to a value equivalent to the possible size of dirt on the document placement surface (for example a value equivalent to 3 mm). Additionally, when the area of a group or the area of the circumscribed rectangle region of a group is less than or equal to a threshold value, the first edge pixel extractor 203 may remove the edge pixels included in the group. Using these methods, edge pixels appearing due to dirt on the document placement surface can be removed.

Figure 8D:
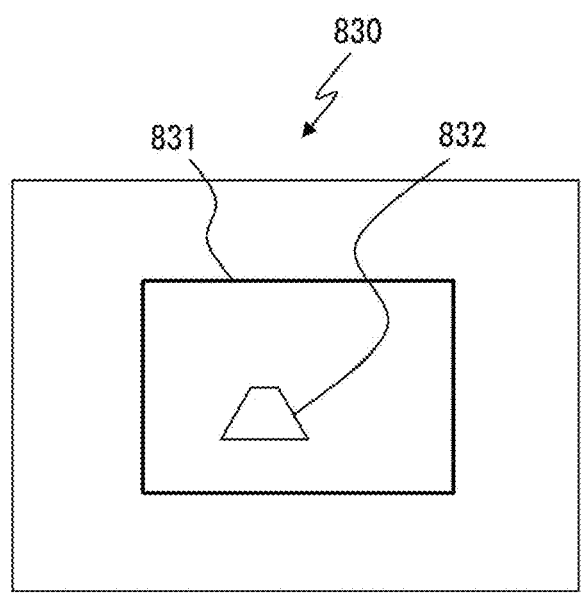
FIG. 8D is a schematic diagram illustrating an image in the candidate region detection processing.

The image 830 illustrated in FIG. 8D is an example of first edge pixels extracted by the first edge pixel extractor 203. In the image 830, a stripe pattern produced due to deterioration of glue are not extracted as first edge pixels and only the edges 831 of a photograph and the edges 832 of a reddish portion in the photograph are extracted as first edge pixels.

Then, the second-color-component image generator 204 extracts a second color component different from the first color component from the second input image to generate a second-color-component image and stores the second-color-component image in the second image memory 22 (step S406). For example, a red color component is set as the second color component so that both of a region that is reddish due to deterioration of glue on the page of the album and a white region can be extracted.

The second-color-component image generator 204 generates a second-color-component image made up of pixel data having an R value from the second input image.

Figure 8E:
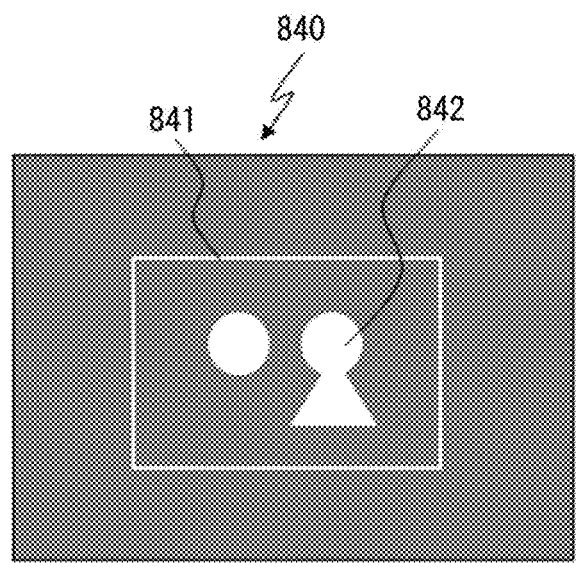
FIG. 8E is a schematic diagram illustrating an image in the candidate region detection processing.

The image 840 illustrated in FIG. 8E is an example of the second-color-component image. In the second-color-component image 840, pixels corresponding to reddish portions and white portions of the second input image have high pixel values and the other portions, i.e. pixels corresponding to the edges 841 of the photograph and to the other color components in the photograph have low pixel values.

Note that the second-color-component image generator 204 may detect a color that is the largest in quantity included in the second input image and may determine the second color component based on the detected color. In that case, the second-color-component image generator 204 calculates the sum of R values, the sum of G values, and the sum of B values of the pixels in the second input image, detects the color component that has the largest sum, and determines the detected color component as a particular color component. In this way, even when a background pattern tinged with a color other than red appears in the second input image, the second-color-component image generator 204 can generate a second-color-component image in which the pattern is submerged.

Then, the second edge pixel extractor 205 uses a threshold value Th3 to extract second edge pixels in the horizontal direction and the vertical direction from the second-color-component image (step S407).

Like the first edge pixel extractor 203, the second edge pixel extractor 205 calculates a neighboring difference value in the horizontal direction of each pixel of the second-color-component image and designates the pixel on the image as a vertical edge pixel when the neighboring difference value exceeds a threshold value Th3. Furthermore, the second edge pixel extractor 205 executes the same processing for each image in the vertical direction and extracts horizontal edge pixels. The threshold value Th3 is a predetermined value and, it is possible to set the threshold value Th3 as a value difference (for example, 20) where, for example, people can visually discriminate a difference between color components on an image.

Note that the second edge pixel extractor 205 may determine the threshold value Th3 based on pixels in the second-color-component image. In that case, the second edge pixel extractor 205 calculates a neighboring difference value in the horizontal direction and a neighboring difference value in the vertical direction of each pixel in the second-color-component image and generates a histogram of the calculated neighboring difference values. The second edge pixel extractor 205 determines the threshold value Th3 so that the threshold value Th3 is equal to a value between neighboring difference values that respectively correspond to local maximum values in the generated histogram by using Otsu's binarization method, for example. By using the threshold Th3 to binarize the neighboring difference values of each pixel in the second-color-component image, the reddish region and the white region can be properly separated from the other regions.

Furthermore, like the first edge pixel extractor 203, the second edge pixel extractor 205 may remove the edge pixels included in a group of a size in the horizontal or vertical direction smaller than or equal to a threshold value Th2. Additionally, when the area of a group or the area of the circumscribed rectangle region of a group is less than or equal to a threshold value, the first edge pixel extractor 205 may remove the edge pixels included in the group. Using these methods, edge pixels appearing due to dirt on the document placement surface can be removed.

Figure 8F:
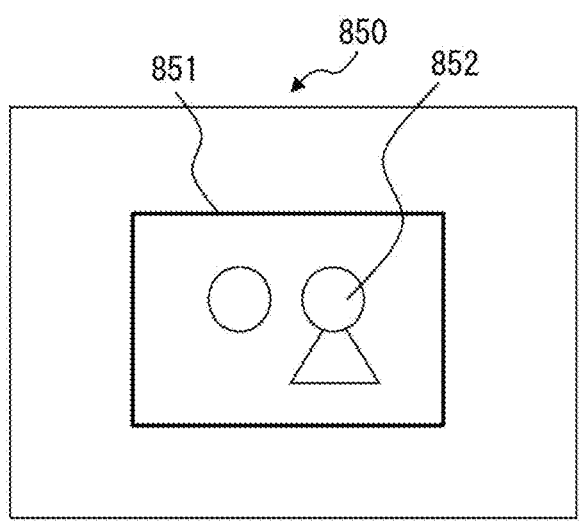
FIG. 8F is a schematic diagram illustrating an image in the candidate region detection processing.

The image 850 illustrated in FIG. 8F is an example of the second edge pixels extracted by the second edge pixel extractor 205. In the image 850, a stripe pattern produced due to deterioration of glue is not extracted as second edge pixels and only the edges 851 of a photograph and the edges 852 of a portion tinged with a color other than a reddish color in the photograph are extracted as second edge pixels.

The edge image generator 206 generates, as a first edge image, an image made up of the pixels extracted as the first edge pixels by the first edge pixel extractor 203 or the pixels extracted as the second edge pixels by the second edge pixel extractor 205. The edge image generator 206 stores the generated first edge image in the second image memory 22 (step S408). Note that the edge image generator 206 may execute expansion/contraction processing for the generated first edge image. Even when part of connected portions in the second input image is not extracted as edge pixels, the portions can be connected in the first edge image.

The image 900 illustrated in FIG. 9A is an example of the first edge image. In the first edge image 900, a stripe pattern produced due to deterioration of glue is not extracted and only the edges 901 of a photograph and the edges 902 of people in the photograph are extracted.

Then, the edge image generator 206 determines whether or not each edge pixels is connected to another edge pixel in the first edge image, and labels connected edge pixels as one group (step S409). The candidate region detector 207 determines edge pixels adjacent to each other in the horizontal direction, vertical direction or oblique directions (eight neighborhoods) to be connected. Note that the edge image generator 206 may determine edge pixels adjacent to each other only in the horizontal or vertical direction (four neighborhoods) to be connected.

Then, the edge image generator 206 determines whether or not both sizes of each group in the horizontal and vertical directions are less than or equal to a threshold value Th4, and removes, from the edge image, edge pixels contained in a group where both sizes of the horizontal and vertical directions are less than or equal to the threshold value Th4 (step S410). The threshold value Th4 is set as a minimum size (for example, a value equivalent to 1 inch) of a document where the information processing apparatus 40 ensures detection. Note that the candidate region detector 207 may remove edge pixels when a size in any one of the horizontal and vertical directions of each group is less than or equal to the threshold value Th4 or when an area of each group or an area of a circumscribed rectangle region of each group is less than or equal to the threshold value. The threshold value to be compared with the area of the circumscribed rectangle region may be a value equivalent to 1 square inch, for example.

Then, the edge image generator 206 determines whether or not each group is included in another group and removes, from the first edge image, edge pixels contained in a group included in another group (step S411).

The image 910 illustrated in FIG. 9B is an example of the first edge image resulting from removal of the edge pixels contained in a group included in another group. In the image 910, a group of edge pixels based on the content in the photograph, such as the people illustrated in FIG. 9A, are removed.

Then, with respect to each remaining group having not been removed, the candidate region detector 207 detects a region surrounded by edge pixels contained in the group and detects a region in the first input image corresponding to the detected region as a candidate region. The candidate region detector 207 stores the circumscribed rectangle region of the candidate region in the first input image in the second image memory 22 (step S412) and ends a series of steps.

In the image 910 illustrated in FIG. 9B, the region surrounded by connected edge pixels is a region including the outermost outer circumference 911 of the group of connected edge pixels and an inside thereof, and includes not only the edge pixels but also all pixels 912 present inside the outer circumference 911.

Note that a region enclosed by connected edge pixels may be a region that does not include the outermost circumference of a group of connected edge pixels. Alternatively, a region enclosed by connected edge pixels may be a region where the outermost circumference of the group of the connected edge pixels and the region inside the outermost circumference are expanded or contracted by a predetermined number of pixels. Furthermore, extraction/contraction processing may be performed for connected edge pixels as described above to include not only pixels adjacent to each other but pixels located within a predetermined distance from each other and pixels between those pixels. Moreover, when edge pixels located at the both ends of connected edge pixels are within a predetermined distance from each other, pixels located between the edge pixels at the both ends may be included in the connected edge pixels. The predetermined distance may be a value equal to the length of the connected edge pixels multiplied by a predetermined factor (for example 80%), for example. This enables edge pixels at the both ends of edge pixels connected in a horseshoe shape, for example, to be interconnected to form an enclosed region.

FIG. 10 is a flowchart illustrating an exemplary operation of the rectangle region detection processing. The flow of the operation illustrated in FIG. 10 is executed at step S303 of the flowchart illustrated in FIG. 6.

At steps S501 through S507, the components of the image processing circuit 27 extract first edge pixels or second edge pixels to generate an image made up of the extracted pixels as a second edge image, as in steps S402 through S408 of FIG. 7. The components of the image processing circuit 27 extract first edge pixels and second edge pixels in a candidate region.

The image processing circuit 27 may calculate a threshold value based on pixels in the candidate region and may use the calculated threshold value instead of the first threshold value to extract edge pixels and may generate an image made up of the extracted pixels as a second edge image. In that case, the image processing circuit 27 calculates a neighboring difference value for each of the pixels in the candidate region in the horizontal direction and a neighboring difference value for each pixel in the vertical direction and generates a histogram of the calculated neighboring difference values. The image processing circuit 27 then uses Otsu's binarization method, for example, to determine a threshold value and uses the determined threshold value to binarize the neighboring difference values of the pixels in the second input image, thereby extracting edge pixels.

Alternatively, the image processing circuit 27 may use other method to extract vertical edge pixels and horizontal edge pixels. For example, the image processing circuit 27 decimates the pixels in the first input image with different rates of decimation to generate a plurality of decimated images and extracts vertical edge pixels from each of the first input image and the decimated images to generate edge images made up of vertical edge pixels. The image processing circuit 27 increases the resolution of an edge image generated from the smallest decimated image to the resolution of an edge image generated from the next smallest decimated image to generate an image made up of vertical edge pixels located in the same positions in the two edge images with the same resolution. The image processing circuit 27 repeats the same processing on the generated image and an edge image generated from the next smallest decimated image, thereby ultimately extracting vertical edge pixels located in the same positions as the vertical edge pixels in an edge image generated from the first input image. Furthermore, the image processing circuit 27 performs the same processing to extract horizontal edge pixels. In this way, vertical edge pixels and horizontal edge pixels can be extracted while reducing noise.

Note that the components of the image processing circuit 27 do not perform expansion/contraction processing on the generated second edge image. This can prevent a pattern on the desk, noise and the like in the second edge image from being erroneously connected.

Then the outer edge pixel extractor 208 determines whether or not an edge of the candidate region is close to an edge of the first input image (step S508). When any of the left, right, top and bottom edges of the candidate region is located within a predetermined distance from the left, right, top or bottom edge of the first input image, the outer edge pixel extractor 208 determines that the edges are close to each other; when the edges are not within the predetermined distance, the outer edge pixel extractor 209 determines that the edges are not close to each other. The predetermined distance is chosen to be a value equal to a maximum distance from an edge of the first input image from which edge pixels is unlikely to be extracted although an object appearing in the candidate region intersects the edge of the first input image, and may be a distance equivalent to 10 mm, for example.

Note that when a candidate region does not fit in a predetermined document reading range in the first input image but instead extends beyond the document reading range, the outer edge pixel extractor 208 may determine that an edge of the candidate region is close to an edge of the first input image; when the candidate region fits in the document reading range, the outer edge pixel extractor 208 may determine that none of the edges of the candidate region are close to the edges of the first input image.

When the edges of the candidate region are not close to the edges of the first input image, the outer edge pixel extractor 208 extracts outer edge pixels located at the outer side among the extracted edge pixels. The outer edge pixel extractor 208 generates an image made up of the extracted outer edge pixels as a third edge image (step S509).

Figure 11A:
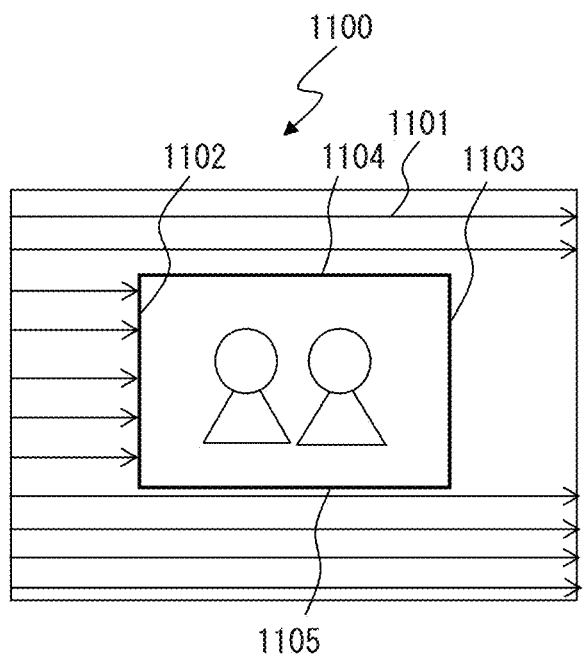
FIG. 11A is a schematic diagram illustrating outer edge pixel extraction processing.
Figure 11B:
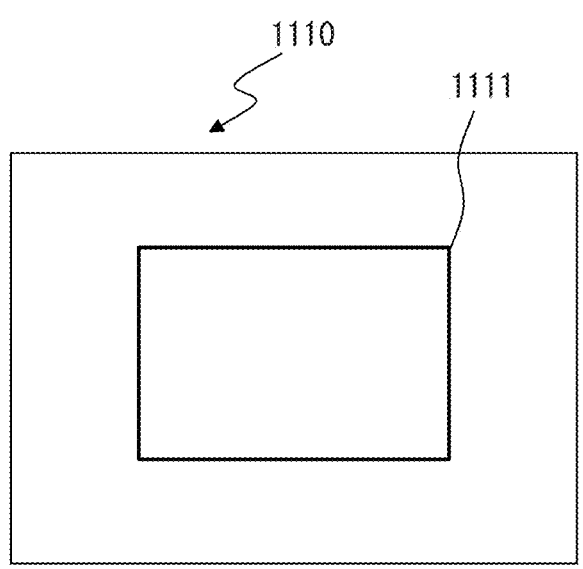
FIG. 11B is a schematic diagram illustrating outer edge pixel extraction processing.

FIGS. 11A and 11B are schematic diagrams illustrating the outer edge pixel extraction processing. The image 1100 illustrated in FIG. 11A is an example of the second edge image. As illustrated in FIG. 11A, the outer edge pixel extractor 208 scans each horizontal line in the second edge image 1100 from left to right as indicated by arrows 1101 to extract, as an outer edge pixel, the first edge pixel 1102 detected. Similarly, the outer edge pixel extractor 208 scans each horizontal line in the second edge image 1100 from right to left to extracts, as an outer edge pixel, the first edge pixel 1103 detected. Similarly, the outer edge pixel extractor 208 scans each vertical line in the second edge image 1100 from top to bottom and bottom to top to extracts, as outer edge pixels, the first edge pixels 1104, 1105, detected. In other words, the outer edge pixel extractor 208 extracts the leftmost and rightmost edge pixels in each horizontal line in the candidate region and the uppermost and lowermost edge pixels in each vertical line in the candidate region as outer edge pixels.

The image 1110 illustrated in FIG. 11B is exemplary outer edge pixels extracted. As illustrated in FIG. 11B, outer edge pixels 1111 are constituted by edge pixels 1102-1105 detected in the second edge image 1100 in FIG. 11A.

On the other hand, when an edge of the candidate region is close to an edge of the first input image, the outer edge pixel extractor 208 generates, as the third edge image, an image made up of all of the edge pixels in the candidate region (step S510). In this case, the rectangle region detector 211 detects a rectangle region from among all of the edge pixels in the candidate region in rectangle region detection processing, which will be described later.

Figure 12A:
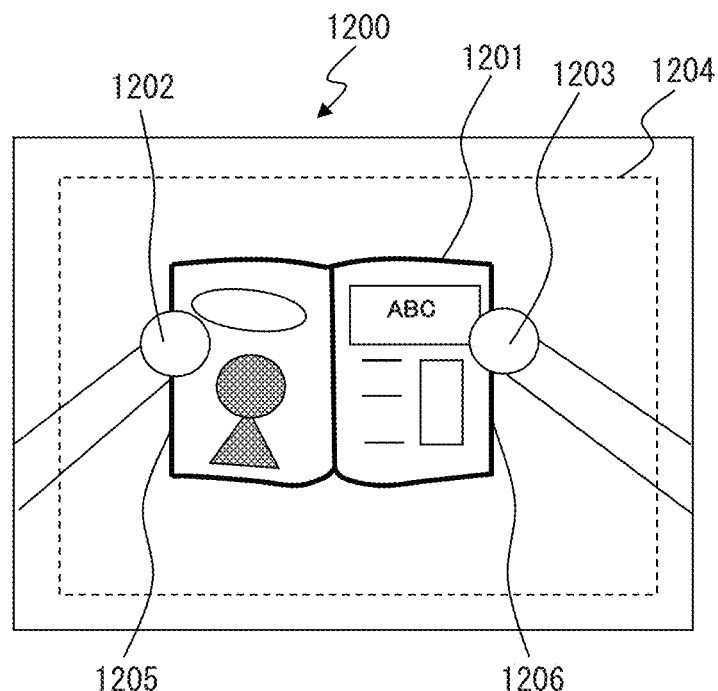
FIG. 12A is a schematic diagram illustrating an example in which a candidate region and an edge of an input image are close to each other.
Figure 12B:
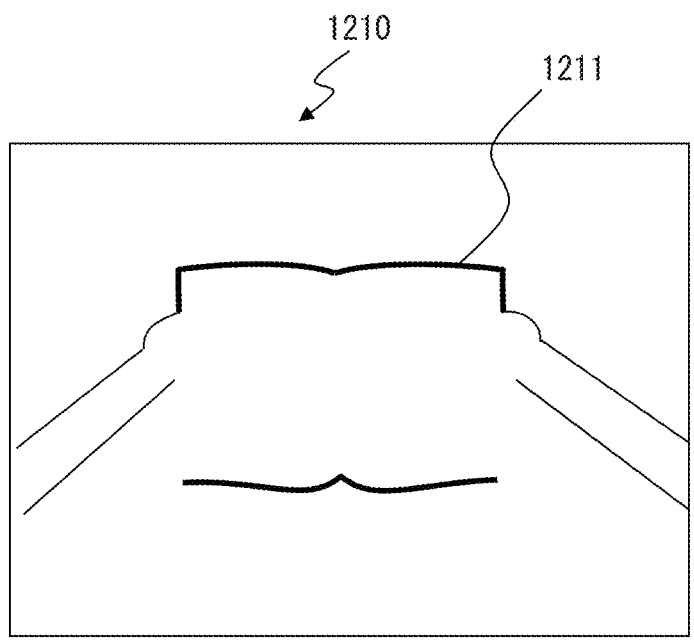
FIG. 12B is a schematic diagram illustrating an example in which a candidate region and an edge of an input image are close to each other.

FIGS. 12A and 12B are schematic diagrams illustrating an example in which an edge of a candidate region is close to an edge of the first input image. The image 1200 illustrated in FIG. 12A illustrates a situation in which a book 1201 is held by the hands 1202 and 1203 of a user. In this example, edge pixels that appear due to the presence of the hands 1202 and 1203 of the user do not fit into a document reading range 1204 but instead extend beyond the document reading range 1204 to edges of the first input image. The image 1210 in FIG. 12B illustrates an example of outer edge pixels extracted from the image 1200 in FIG. 12A. As illustrated in FIG. 12B, edges of the book 1205 and 1206 that are located interiorly to the hands 1202 and 1203 of the user are not extracted as outer edge pixels 1211. In such a case, exclusion of edges of the document from extraction can be prevented by generating an image made up of all of the edge pixels in the candidate region as a third edge image.

This can also prevent exclusion of edges of the document from extraction due to interconnection between edge pixels detected in an edge of the document and edge pixels detected in a pattern on the desk when the edge strength of a pattern or the like on the desk on which the document is placed is high.

Note that when an edge of a candidate region is close to an edge of the first input image, the outer edge pixel extractor 208 may remove some of the edge pixels in the candidate region from the third edge image. For example, when an edge of the candidate region is close to a horizontal edge of the first input image, the outer edge pixel extractor 208 detects a vertical straight line in the candidate region; when an edge of the candidate region is close to a vertical edge of the first input image, the outer edge pixel extractor 208 detects a horizontal straight line in the candidate region. The outer edge pixel extractor 208 removes edge pixels between two straight lines detected at the outermost locations from the third edge image. This can exclude contents and the like in the document from the document edge detection to improve the accuracy of the document edge detection.

Then the straight line detector 209 detects a plurality of straight lines in the third edge image (step S511). The straight line detector 209 uses the Hough transform to detect straight lines. Note that the straight line detector 209 may use the least-square method to detect straight lines. Alternatively, the straight line detector 209 may use the least-square method for edge pixels within a predetermined distance from a straight line detected by using the Hough transform to detect a straight line. The predetermined distance is chosen as appropriate in accordance with the environment in which the image processing system 1 is used or other factors and may be set to a distance equivalent to 2 mm, for example.

The straight line detector 209 then detects approximate straight lines in the third edge image (step S512).

Figure 13A:
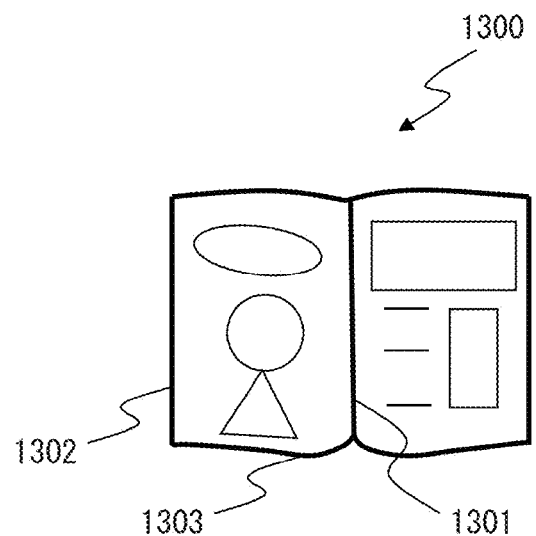
FIG. 13A is a schematic diagram for illustrating an approximate straight line.
Figure 13B:
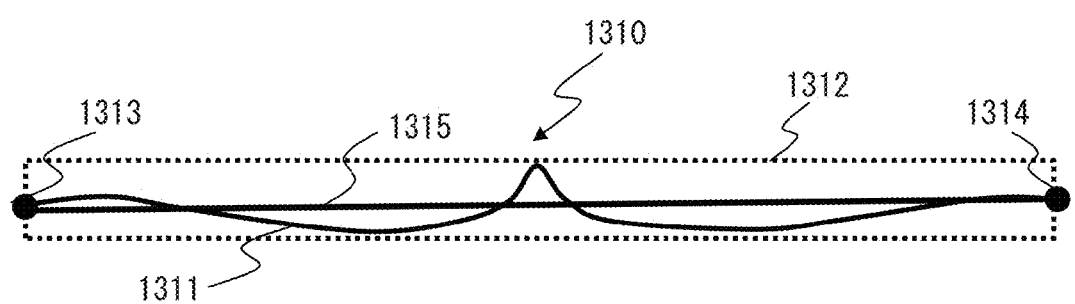
FIG. 13B is a schematic diagram for illustrating an approximate straight line.

FIGS. 13A and 13B are schematic diagrams for illustrating approximate straight lines. In a first input image 1300 acquired by imaging a book as illustrated in FIG. 13A, an edge 1302 parallel to the saddle-stitched portion 1301 of the book is detected as a straight line. However, an edge 1303 perpendicular to the saddle-stitched portion 1301 can distort at a portion near the saddle-stitched portion 1301 and therefore may not be detected as a straight line.

To avoid this, the straight line detector 209 labels adjacent edge pixels 1311 to cluster the edge pixels 1311 together into a group 1312 as illustrated in the edge image 1310 in FIG. 13B. The straight line detector 209 detects, as an approximate straight line, a straight line 1315 that links an edge pixel 1313 and an edge pixel 1314 that are located at the ends of the group 1312 in the horizontal direction or the vertical direction among the edge pixels included in the group 1312.

Then the rectangle region detector 210 detects a rectangle region composed of the straight lines or approximate straight lines detected by the straight line detector 209 (step S513) and ends the sequence of the steps. In this way, the rectangle region detector 210 detects a rectangle region from the first edge pixels or the second edge pixels.

The rectangle region detector 210 extracts a plurality of candidate rectangle regions each of which is composed of four straight lines or approximate straight lines which consist of two pairs of the plurality of the straight lines or approximate straight lines detected by the straight line detector 209 intersecting at substantially right angles. The rectangle region detector 210 first selects a horizontal straight line (hereinafter referred to as a first horizontal line) and extracts a horizontal straight line (hereinafter referred to as a second horizontal line) that is substantially parallel (for example within ±3°) to the selected straight line and at a distance greater than or equal to a threshold value Th4 from the selected straight line. The rectangle region detector 210 then extracts a vertical straight line (hereinafter referred to as a first vertical line) that is substantially orthogonal (for example within ±3° from 90°) to the first horizontal line. The rectangle region detector 210 then extracts a vertical straight line (hereinafter referred to as a second vertical line) that is substantially orthogonal to the first horizontal line and at a distance greater than or equal to a threshold value Th5 from the first vertical line. Note that the threshold values Th4 and Th5 are predetermined in accordance with the size of a document to be read by the image reading apparatus 10 and may equal to each other.

The rectangle region detector 210 extracts all combinations of the first horizontal lines, second horizontal lines, first vertical lines, and second vertical lines that satisfy the conditions described above among all of the straight lines or approximate straight lines detected by the straight line detector 209 and extracts rectangle regions each of which is formed by each of the extracted combinations as candidate rectangle regions. The rectangle region detector 210 calculates the areas of the extracted candidate rectangle regions and removes candidate rectangle regions that have areas less than a predetermined value. The rectangle region detector 210 detects a candidate rectangle region that has the largest area among the remaining candidate rectangle regions as a rectangle region. On the other hand, when no candidate rectangle region has been left, the rectangle region detector 210 detects no rectangle region.

Note that the rectangle region detector 210 may calculate the ratio of the number of edge pixels within a predetermined distance (for example a distance equivalent to 2 mm) from each side of each candidate rectangle region to the total number of the pixels within the predetermined distance and may multiply the area of each candidate rectangle region by the ratio to assign a weight to the candidate rectangle region. This enables detection of rectangle regions composed of straight lines that clearly represent the border of the document. Alternatively, the rectangle region detector 210 may calculate, for each candidate rectangle region, a score for each angle of the candidate rectangle region that represents the likelihood of being a corner and may use the score to assign a weight to the area of the candidate rectangle region.

Figure 14:
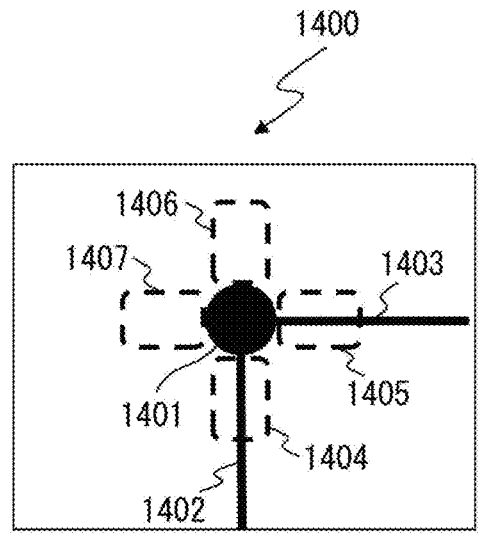
FIG. 14 is a schematic diagram for illustrating an evaluation score of a corner of a candidate rectangle region.

FIG. 14 is a schematic diagram for illustrating the score of each corner of a candidate rectangle region. In the image 1400 illustrated in FIG. 14, a point 1401 represents a corner of a candidate rectangle region and straight lines 1402, 1403 represent sides of a candidate rectangle region. When ends of the straight lines 1402, 1403 are in contact with each other, the point 1401 is likely to be a corner of a rectangle region. When the ends of the straight lines 1402, 1403 are not in contact with each other or the straight lines 1402, 1403 cross each other, the point 1401 is unlikely to be a corner of a rectangle region.

The base of the scoring is 0. Determination is made as to whether or not there is an edge pixel in each horizontal line in a region 1404 within a predetermined distance from a side 1402 near the corner 1401. When there is an edge pixel in a horizontal line, 1 is added to the score. The range near each corner and the predetermined distance from each side are chosen as appropriate according to the environment in which the image processing system 1 is used or other factors and may be a range within a distance equivalent to 5 mm from each corner and a distance equivalent to 2 mm from each side, for example. Similarly, determination is made as to whether or not there is an edge pixel in each vertical line in a region 1405 within the predetermined distance from a side 1403 near the corner 1401. When there is an edge pixel in a vertical line, 1 is added to the score. Furthermore, determination is made as to whether or not there is an edge pixel in each horizontal line in a region 1406 within the predetermined distance from a line extended from the side 1402 near the corner 1401. When there is an edge pixel in a horizontal line, 1 is subtracted from the score. Similarly, determination is made as to whether or not there is an edge pixel in each vertical line in a region 1407 within the predetermined distance from a line extended from the side 1403 near the corner 1401. When there is an edge pixel in a vertical line, 1 is subtracted from the score. The rectangle region detector 210 normalizes the scores so that the lowest possible score is 0 and the highest possible score is 1 and multiplies the area of each candidate rectangle region by the normalized value to assign a weight, thereby the rectangle region detector 210 can detects a rectangle region that clearly represents four corners.

Figure 15A:
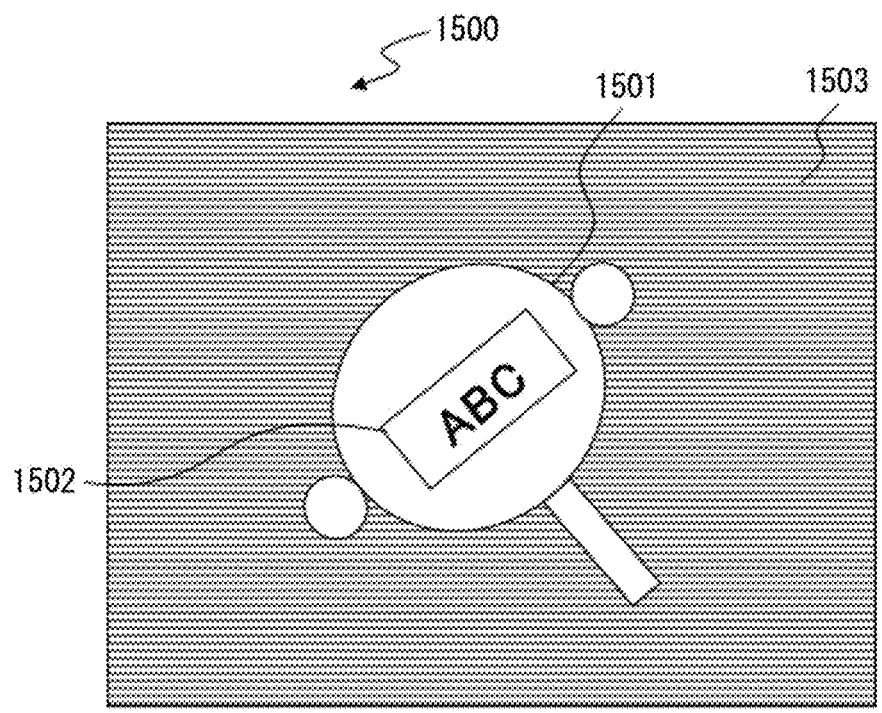
FIG. 15A is a schematic diagram illustrating rectangle region detection processing.
Figure 15B:
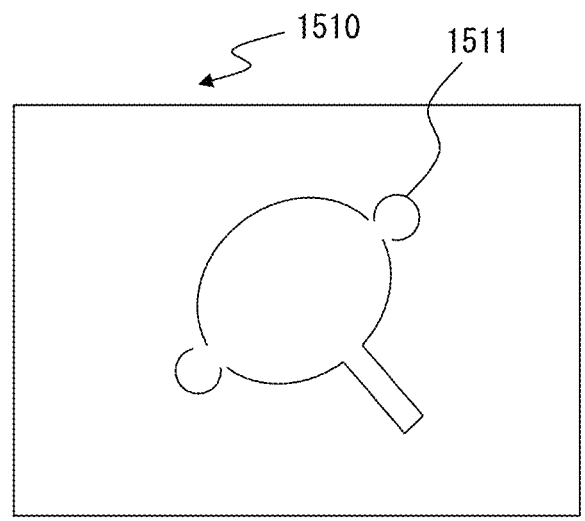
FIG. 15B is a schematic diagram illustrating rectangle region detection processing.
Figure 15C:
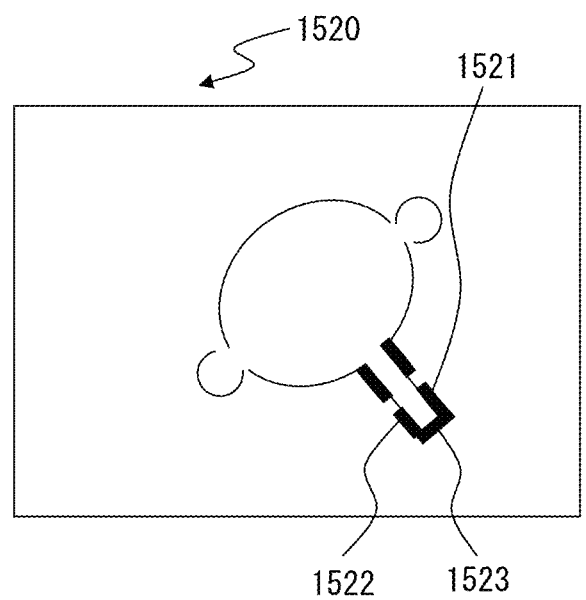
FIG. 15C is a schematic diagram illustrating rectangle region detection processing.

FIGS. 15A to 15C are schematic diagrams for illustrating rectangle region detection processing executed on non-rectangle image. The image 1500 illustrated in FIG. 15A is an example of a first input image obtained by imaging a round-fan-shaped object 1501 that has a rectangular pattern 1502 and is affixed on a page of an album. The image 1510 illustrated in FIG. 15B is an example of a third edge image generated from the first input image 1500. As illustrated in FIG. 15B, the third edge image 1510 is made up of outer edge pixels 1511 and a stripe pattern 1503 and the rectangular pattern 1502 are not extracted in the third edge image 1510. The image 1520 illustrated in FIG. 15C is an example of straight lines extracted from the third edge image 1510. As illustrated in FIG. 15C, handle portions 1521 to 1523 of the shape of the round fan are detected as straight lines from the third edge image 1510. However, a rectangle region formed of four straight lines where two straight lines each are substantially at right angles to each other is not detected in the examples illustrated in FIGS. 15A to 15c.

Figure 16:
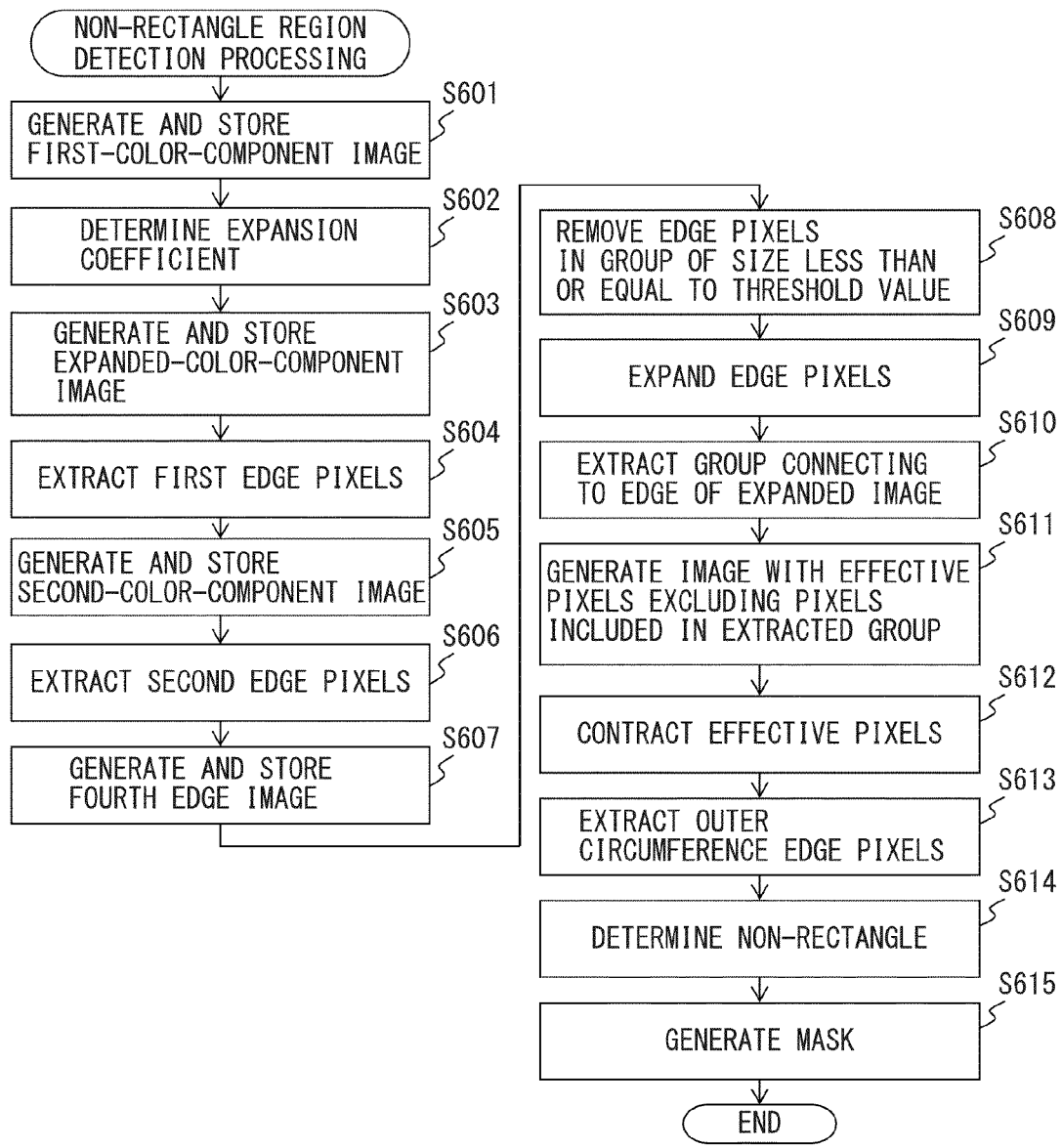
FIG. 16 is a flowchart illustrating an exemplary operation of non-rectangle region detection processing.

FIG. 16 is a flowchart illustrating an exemplary operation of non-rectangle region detection processing. The flow of the operation illustrated in FIG. 16 is executed at step S308 of the flowchart illustrated in FIG. 6.

At steps S601 through S606, the components of the image processing circuit 27 extract first edge pixels or second edge pixels as in steps S402 through S408 of FIG. 7 or steps S501 through S507 of FIG. 10. The components of the image processing circuit 27 generate an image made up of the extracted pixels as a fourth edge image. However, the components of the image processing circuit 27 extract first edge pixels or second edge pixels in the horizontal, vertical and diagonal directions in a candidate region.

The first edge pixel extractor 203 and the second edge pixel extractor 205 calculate neighboring difference values for each of the pixels in expanded-color-component image in the vertical direction from top to bottom, the horizontal direction from left to right, the diagonal direction from bottom left to top right, and the diagonal direction from bottom right to top left. When the absolute value of any of the calculated neighboring difference values exceeds the first threshold value, the first edge pixel extractor 203 and the second edge pixel extractor 205 determine pixels on the image as edge pixels.

Note that the first edge pixel extractor 203 or the second edge pixel extractor 205 may calculate a threshold value based on the pixels in a candidate region in the second input image, may use the calculated threshold value instead of the first threshold value to extract edge pixels. In that case, the first edge pixel extractor 203 or the second edge pixel extractor 205 calculates, for each pixel in the candidate region, a neighboring difference value in the horizontal direction, a neighboring difference value in the vertical direction and neighboring difference values in the diagonal directions and generates a histogram of the calculated neighboring difference values. The first edge pixel extractor 203 or the second edge pixel extractor 205 then determines a threshold value by using Otsu's binarization method, for example, and uses the determined threshold value to binarize the neighboring difference values for each pixel in the second input image, thereby extracting edge pixels.

Then the edge image generator 206 labels the extracted edge pixels to group the edge pixels. The edge image generator 206 removes the edge pixels included in a group having a size smaller than or equal to the threshold value Th2 (step S608). This can remove noise components included in the fourth edge image.

Then the edge image generator 206 expands edge pixels in the generated fourth edge image to generate a second expansion image (step S609). When part of connected portions in the second input image is not extracted as edge pixels, the expansion can interconnect those portions in the second expansion image.

Then the outer circumference edge pixel extractor 211 executes labeling of pixels other the edge pixels (non-edge pixels) in the expansion image to extract a group that connects to an edge of the expansion image (step S610).

Figure 17A:
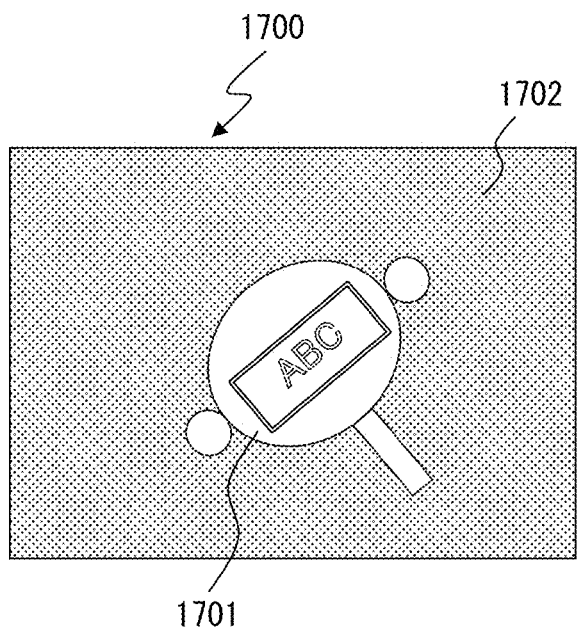
FIG. 17A is a schematic diagram illustrating an image in non-rectangle region detection processing.
Figure 17B:
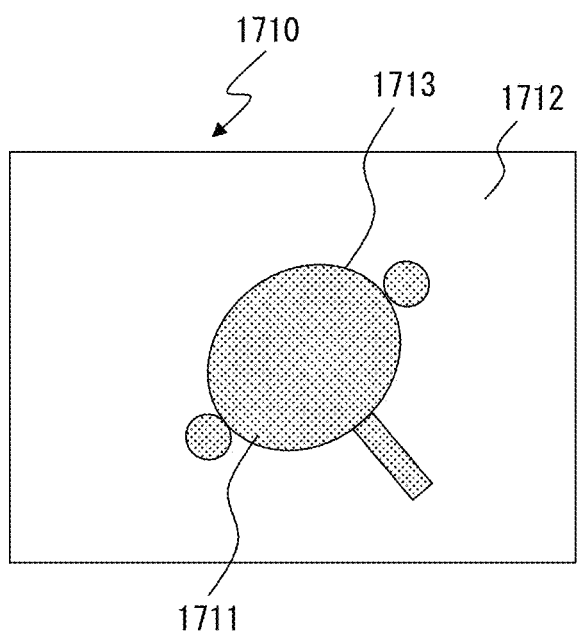
FIG. 17B is a schematic diagram illustrating an image in non-rectangle region detection processing.

FIGS. 17A and 17B are schematic diagrams illustrating images in the non-rectangle region detection processing. As in the image 1700 illustrated in FIG. 17A, a group 1702 that connects to the edges of the expansion image is a group of non-edge pixels located outside the outer circumference of a document 1701.

Then the outer circumference edge pixel extractor 211 generates an image in which the pixels included in the extracted group are invalid pixels and the other pixels are valid images (step S611).

The image 1710 illustrated in FIG. 17B is an example of the image generated at step S611. In the image 1710, the pixels 1712 included in the extracted group are invalid pixels and the other pixels 1711 are valid pixels.

Then the outer circumference edge pixel extractor 211 contracts the valid pixels in the generated image to generate a construction image (step S612). The contraction processing is executed in order to restore the edge pixels expanded at step S609 to the original size. Accordingly, the non-rectangle region detector 212 contracts the non-rectangle region by the same degree as the degree of expansion of the edge pixels expanded at step S609. Note that the non-rectangle region detector 212 may contract the non-rectangle region by a degree greater than the degree of expansion of the edge pixels expanded at step S609. In that case, edge pixels detected due to a pattern on the desk on which the document is placed or the like can be removed from the valid pixels when the edge strength of the pattern of the desk or the like is high.

The outer circumference edge pixel extractor 211 then extracts edge pixels making up the outer circumference of the valid pixels in the contracted image as outer circumference edge pixels (step S613).

As illustrated in FIG. 17B, the outer circumference edge pixels 1713 making up the outer circumference of the valid pixels 1711 are edge pixels that make up the outer circumference of connected edge pixels.

Then the non-rectangle region detector 212 detects a non-rectangle region surrounded by the extracted outer circumference edge pixels (step S614). When the non-rectangle region detector 212 detects a plurality of non-rectangle regions, the non-rectangle region detector 212 selects only the largest non-rectangle region in area as a detected non-rectangle region. This can remove noise generated due to a pattern on the desk or the like.

Then, based on the detected non-rectangle region, the mask generator 213 generates a mask for separating a background from an image to be cut out (step S615). The mask includes the same number of pixels as the pixels of the cut-out image in each of the horizontal and vertical directions and is formed by an image including valid pixels which are pixels corresponding to the detected non-rectangle region and invalid pixels which are the other pixels. The information processing apparatus 20 can extract a separated image by using the mask to extract only the pixels that correspond to the positions of the valid pixels in the mask from the cut-out image.

Note that the image processing circuit 27 may omit the candidate region detection processing illustrated at step S301 of FIG. 6 and may execute the rectangle region detection processing and the non-rectangle region detection processing on the entire first input image. In that case, again, the information processing apparatus 20 can properly determine a region in which an image of a document is to be cut out.

Furthermore, the image processing circuit 27 may use edge pixels for detecting a candidate region to detect a rectangle region or a non-rectangle region instead of separately detecting edge pixels for detecting a candidate region, edge pixels for detecting a rectangle region, and edge pixels for detecting a non-rectangle region. In that case, the information processing apparatus 20 can reduce processing load of the edge pixel detection processing and can speed up the processing.

Furthermore, the image processing circuit 27 may omit the non-rectangle region detection processing at step S308 of FIG. 6, and may use a candidate region as a non-rectangle region when no rectangle region has been detected. In that case, the outer circumference edge pixel extractor 211 extracts edge pixels that make up the outer circumference of the candidate region as outer circumference edge pixels and the non-rectangle region detector 212 detects the candidate region as a non-rectangle region.

Furthermore, the image processing circuit 27 may omit any one of the processing at step S402 through step S405 and the processing at S406 and S407 of FIG. 7 and may generate, as a first edge image, an image made up of only any one of the first edge pixels and the second edge pixels. Similarly, the image processing circuit 27 may omit any one of the processing at step S501 through step S504 and the processing at S505 and S506 of FIG. 10 and may generate, as a second edge image, an image made up of only any one of the first edge pixels and the second edge pixels. Similarly, the image processing circuit 27 may omit any one of the processing at step S601 through S604 and the processing at S605 and S606 and may generate, as a fourth edge image, an image made up of only any one of the first edge pixels and the second edge pixels. In any of these cases, the information processing apparatus 20 is capable of accurately separating a document from a background.

As has been described above, the information processing apparatus 20 can accurately detect the region of an image of a document that is to be cut out by operating in accordance with the flowcharts illustrated in FIGS. 4, 6, 7, 10 and 16. In particular, the information processing apparatus 20 is capable of accurately detecting the region of a photograph with a high-contrast background such as an input image in which a photograph affixed on a page of an album in which photographs can be affixed on self-adhesive pages appears.

Furthermore, the information processing apparatus 20 can accurately detect the contour of an imaging subject and remove the background even when the imaging subject has a non-rectangular shape, such as a solid, a hand, or a photo clipping.

Furthermore, the information processing apparatus 20 uses only vertical and horizontal edge pixels as the edge pixels for detecting a rectangle region and uses diagonal edge pixels in addition to the vertical and horizontal edge pixels as the edge pixels for detecting a non-rectangle region. Thus, the information processing apparatus 20 can reduce the influence of noise due to a background or the like when detecting a rectangle region consisting of straight lines, which can be detected even when a small portion of edges is missing while preventing missing of a portion of edges when detecting a non-rectangle region, which has curves, which are difficult to detect when a portion of edges is missing.

Figure 18:
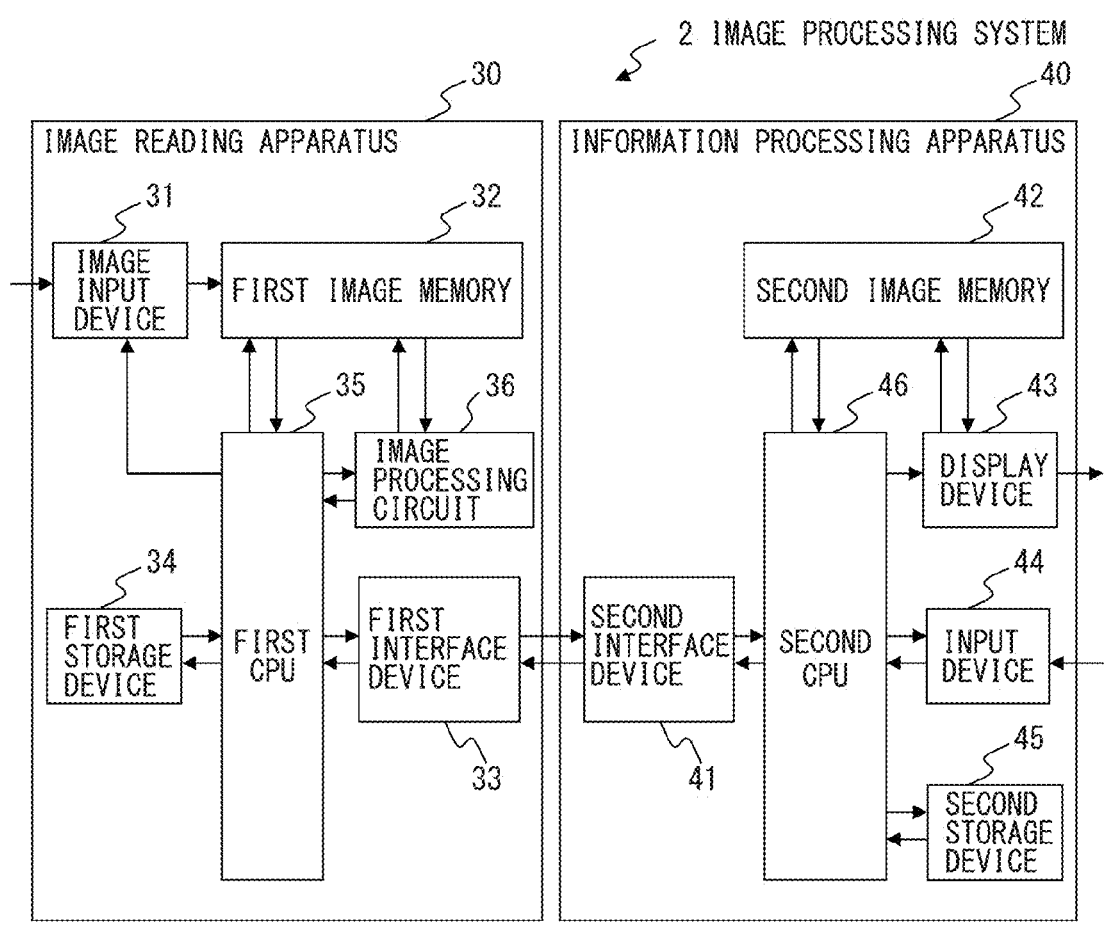
FIG. 18 is a diagram schematically illustrating a configuration of another image processing system 2.

FIG. 18 is a diagram schematically illustrating a configuration of another image processing system 2. The image processing system 2 illustrated in FIG. 18 differs from the image processing system 1 illustrated in FIG. 1 in that a different device includes an image processing circuit. In other words, in the image processing system 2, an image reading apparatus 30, instead of the information processing apparatus 40, includes an image processing circuit 36. The image processing circuit 36 has a function similar to the function of the image processing circuit 27 of the information processing apparatus 20.

In the image processing system 2 illustrated in FIG. 18, processing substantially the same as the processing illustrated in FIGS. 3 and 4 described previously can be executed. How the image reading processing illustrated in the flowchart of FIG. 3 and the document cutting processing illustrated in the flowchart of FIG. 4 are adapted will be described below. In the image processing system 2, processing at step S101 and processing at steps S202 through S203 are executed primarily by a first CPU 35 in cooperation with elements of the image reading apparatus 30 in accordance with a program that has been stored in a first storage device 34 beforehand.

At step S101, an image input device 31 of the image reading apparatus 30 takes an image of imaging subject to generate a read image and stores the read image in a first image memory 32. Since document cutting process is performed in the image reading apparatus 30, transmission and reception of the read image at steps S102 and S201 are omitted.

Processing at steps S202 through S203 is executed by the image processing circuit 36 of the image reading apparatus 30. The operation of the processing is the same as the processing executed by the image processing circuit 27 of the information processing apparatus 20 described in relation to the image processing system 1. The image processing circuit 36 of the image reading apparatus 30 transmits a cut-out region and a separated image to the information processing apparatus 40 through a first interface device 33.

In this way, the mode in which the image reading apparatus 30 includes the image processing circuit 36 and executes the document cutting processing can achieve the same advantageous effects as the mode in which the information processing apparatus includes the image processing circuit to execute document cutting processing.

While preferred embodiments have been described above, it is not limited to the embodiments. For example, sharing of functions between an image reading apparatus and an information processing apparatus is not limited to the examples of the image processing systems illustrated in FIGS. 2 and 18; the components of the image reading apparatus and the information processing apparatus, including the components in the image processing circuit, can be provided any of the image reading apparatus and the information processing device as appropriate. Alternatively, the image reading apparatus and the information processing apparatus may be configured as a single apparatus.

Furthermore, the first interface device 13 and the second interface device 21 in the image processing system 1 may be interconnected through a network such as the Internet, a telephone network (including a mobile network and a fixed-telephone network) or an intranet. In that case, each of the first interface device 13 and the second interface device 21 is equipped with an interface circuit for connecting to the network. Additionally, in that case, a plurality of information processing apparatuses 20 may be distributed on the network and the information processing apparatuses 20 may cooperate with one another to perform the straight line detection processing, the rectangle region detection processing and other processing in a distributed manner, so that image processing services can be provided in the form of cloud computing. This enables the document cutting off processing to be efficiently performed by the image processing system 1 for images read by a plurality of image reading apparatuses 10.

Similarly, the first interface device 33 of the image reading apparatus 30 and a second interface device 41 of the information processing apparatus 40 in the image processing system 2 illustrated in FIG. 18 may be interconnected through a network.

According to the image processing apparatus, the region detection method and the computer-readable, non-transitory medium, it is possible to accurately detect a region in which an image of a document is to be cut out from a read image.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image processing apparatus comprising:
   an image input device for imaging a document to generate an input image;
   a color component image generator for extracting a particular color component from the input image to generate a color component image;
   an expanded-color-component image generator for expanding particular pixels in the color component image to generate an expanded-color-component image;
   an edge pixel extractor for extracting edge pixels from the expanded-color-component image; and
   a document region detector for detecting a document region in which an entire document is imaged, from the edge pixels.

2. The image processing apparatus according to claim 1, wherein each of the particular pixels is a pixel having a pixel value higher than pixel values of pixels surrounding the particular pixel.

3. The image processing apparatus according to claim 1, wherein the expanded-color-component image generator replaces a pixel value of each pixel in the color component image with a highest pixel value of pixels surrounding said each pixel to generate the expanded-color-component image.

4. The image processing apparatus according to claim 1, wherein the particular color component is a component resulting from subtraction of a blue color component from a red color component.

5. The image processing apparatus according to claim 1, wherein the color component image generator detects a color that is the largest in quantity included in the input image and determines the particular color component based on the detected color.

6. The image processing apparatus according to claim 1, wherein the expanded-color-component image generator determines an expansion coefficient for generating the expanded-color-component image so that the number of the edge pixels is less than or equal to a predetermined number.

7. The image processing apparatus according to claim 1, wherein the expanded-color-component image generator detects a cycle of occurrence of a color in the input image and determines an expansion coefficient for generating the expanded-color-component image based on the detected cycle.

8. The image processing apparatus according to claim 1, further comprising:
   a second-color-component image generator for extracting a second color component different from the particular color component from the input image to generate a second-color-component image; and
   a second edge pixel extractor for extracting second edge pixels from the second-color-component image by using a threshold value,
   wherein the document region detector detects the document region from the edge pixels or the second edge pixels.

9. The image processing apparatus according to claim 8, wherein the threshold value is a predetermined value.

10. The image processing apparatus according to claim 8, wherein the threshold value is determined based on pixels in the second-color-component image.

11. The image processing apparatus according to claim 8, wherein the second color component is a red color component.

12. A region detection method for an image processing apparatus including an image input device for imaging a document to generate an input image, the region detection method comprising:
   extracting a particular color component from the input image to generate a color component image;
   expanding particular pixels in the color component image to generate an expanded-color-component image;

extracting edge pixels from the expanded-color-component image; and detecting, using a computer, a document region in which an entire document is imaged, from the edge pixels.

13. A computer-readable, non-transitory medium storing a computer program, wherein the computer program causes an image processing apparatus, which comprises an image input device for imaging a document to generate an input image, to execute a process, the process comprising:

extracting a particular color component from the input image to generate a color component image;

expanding particular pixels in the color component image to generate an expanded-color-component image;

extracting edge pixels from the expanded-color-component image; and detecting a document region in which an entire document is imaged, from the edge pixels.

* * * * *